(12) United States Patent
Workman et al.

(10) Patent No.: US 7,932,451 B2
(45) Date of Patent: Apr. 26, 2011

(54) MUSICAL INSTRUMENT SUPPORT METHODS AND APPARATUS

(75) Inventors: Jonathan Workman, Fort Collins, CO (US); David Roberts, Windsor, CO (US); Julie T Petit, Fort Collins, CO (US); Todd B Eimen, Fort Collins, CO (US); Donald H Eason, Fort Collins, CO (US)

(73) Assignee: Swift Distribution, Inc., Torrance, CA (US)

( * ) Notice: Subject to any disclaimer, the term of this patent is extended or adjusted under 35 U.S.C. 154(b) by 956 days.

(21) Appl. No.: 11/813,153

(22) PCT Filed: Dec. 30, 2004

(86) PCT No.: PCT/US2004/043990
§ 371 (c)(1),
(2), (4) Date: Jun. 29, 2007

(87) PCT Pub. No.: WO2006/073383
PCT Pub. Date: Jul. 13, 2006

(65) Prior Publication Data
US 2008/0135697 A1 Jun. 12, 2008

(51) Int. Cl.
*G10D 3/00* (2006.01)
(52) U.S. Cl. ........................................................ 84/327
(58) Field of Classification Search .................... 84/453, 84/290, 327, 329; 248/443, 121; 206/314
See application file for complete search history.

(56) References Cited

U.S. PATENT DOCUMENTS

| | | |
|---|---|---|
| D18,940 S | 2/1889 | Jackson |
| 688,623 A | 12/1901 | Forry |
| D137,960 S | 5/1944 | Hager |
| 3,338,539 A | 8/1967 | Foster |
| D257,987 S | 1/1981 | Schoenig |
| 4,321,874 A | 3/1982 | Cenna |
| D264,852 S | 6/1982 | Schoenig |
| D268,458 S | 4/1983 | Schoenig |
| 4,445,415 A | 5/1984 | Izquierdo |
| D288,755 S | 3/1987 | Schoenig |
| D289,952 S | 5/1987 | Kido |

(Continued)

FOREIGN PATENT DOCUMENTS
DE 8907201 U1 9/1989
(Continued)

OTHER PUBLICATIONS

Konig & Meyer Spider Keyboard Stand, audioMIDI.com Dec. 28, 2004.

(Continued)

*Primary Examiner* — Kimberly R Lockett
(74) *Attorney, Agent, or Firm* — Santangelo Law Offices

(57) ABSTRACT

At least one embodiment of the inventive technology may be an item support apparatus (1) that comprises at least two fee (4); a base (5) from which said feet extend at a first retention element (6); at least two risers (7) retained to the base by a second retention element (8); and at least one arm (9) retained to each riser by an arm retainer (10). Disclosed is a novel, efficient yet strong item support stand that may be used to support an item such as a musical instrument (a keyboard, as but one example) and that may be collapsible and/or adjustable in certain embodiments.

30 Claims, 31 Drawing Sheets

U.S. PATENT DOCUMENTS

| | | | |
|---|---|---|---|
| D290,355 S | 6/1987 | Nagele |
| 4,669,691 A | 6/1987 | Solomon |
| 4,763,865 A | 8/1988 | Danner |
| 4,770,380 A | 9/1988 | Eason et al. |
| D304,270 S | 10/1989 | Goldman |
| D306,943 S | 4/1990 | Hodge et al. |
| 4,917,341 A | 4/1990 | Pirchio |
| 4,988,064 A | 1/1991 | Hoshino |
| 4,988,150 A | 1/1991 | Lindow et al. |
| D320,034 S | 9/1991 | Brooks et al. |
| D321,293 S | 11/1991 | Kucsak |
| D323,081 S | 1/1992 | Schaffer |
| 5,112,020 A | 5/1992 | Ginsberg |
| 5,165,635 A | 11/1992 | Hoshino |
| 5,188,321 A | 2/1993 | Hirschenson et al. |
| 5,199,930 A | 4/1993 | Weber |
| D335,889 S | 5/1993 | Gibran |
| 5,208,736 A | 5/1993 | Crooks et al. |
| D336,099 S | 6/1993 | Schoenig |
| 5,251,925 A | 10/1993 | Haley, Sr. |
| 5,301,910 A | 4/1994 | Lang et al. |
| 5,312,076 A | 5/1994 | Rogov |
| 5,322,250 A | 6/1994 | Wilhite, Jr. |
| 5,358,204 A | 10/1994 | Terada |
| 5,390,764 A | 2/1995 | Kerber |
| 5,392,476 A | 2/1995 | Williams |
| 5,395,088 A | 3/1995 | Ginsberg |
| D364,516 S | 11/1995 | Helenowski |
| 5,467,953 A | 11/1995 | Malizia |
| 5,509,629 A | 4/1996 | Sassmannshausen et al. |
| D370,575 S | 6/1996 | Lechleiter et al. |
| 5,565,889 A | 10/1996 | Crooks et al. |
| 5,572,237 A | 11/1996 | Crooks et al. |
| 5,603,480 A | 2/1997 | Chen |
| 5,732,928 A | 3/1998 | Chang |
| 5,894,406 A | 4/1999 | Blend et al. |
| D409,020 S | 5/1999 | Hardin |
| D409,594 S | 5/1999 | Lepack |
| D414,962 S | 10/1999 | Welsh et al. |
| 5,996,814 A | 12/1999 | Workman et al. |
| 6,045,179 A | 4/2000 | Harrison |
| 6,375,135 B1 | 4/2002 | Eason et al. |
| 6,484,977 B1 * | 11/2002 | Yu .............................. 248/125.1 |
| D468,133 S | 1/2003 | Lauts |
| D470,336 S | 2/2003 | Malizia |
| 6,563,035 B2 | 5/2003 | Hsieh |
| D475,555 S | 6/2003 | Lauts |
| 6,695,268 B1 | 2/2004 | Hsieh |
| 2002/0100852 A1 | 8/2002 | Eason et al. |
| 2002/0109051 A1 | 8/2002 | Kitagawa et al. |
| 2004/0144233 A1 | 7/2004 | Hsieh |
| 2006/0185495 A1 * | 8/2006 | Hsieh .............................. 84/327 |

FOREIGN PATENT DOCUMENTS

| | | |
|---|---|---|
| WO | WO 2006/073383 A2 | 7/2006 |
| WO | WO 2006/073383 A3 | 7/2006 |

OTHER PUBLICATIONS

Ultimate Support Systems, Inc. 1993 Product Catalog (Music Stand Edition).
Ultimate Support Systems, Inc. 1994 Product Catalog (Music Stand Edition).
Ultimate Support Systems, Inc. 1996 Product Catalog (Music Stand Edition).
Ultimate Support Systems, Inc. 1998 Product Catalog (Music Stand Edition).
Ultimate Support Systems, Inc. 1999 Product Catalog (Music Stand Edition).
Ultimate Support Systems, Inc. 2000 Product Catalog (Music Stand Edition).
Ultimate Support Systems, Inc. 2001 Product Catalog (Music Stand Edition).
Ultimate Support Systems, Inc. 2002 Product Catalog (Music Stand Edition).
Ultimate Support Systems, Inc. 2003 Product Catalog (Music Stand Edition).
Ultimate Support Systems, Inc. 2004 Product Catalog (Bicycle Stand Edition).
Ultimate Support Systems, Inc. 2004 Product Catalog (Music Stand Edition).
Ultimate Support Systems, Inc. 2005 Product Catalog (Bicycle Stand Edition).
Ultimate Support Systems, Inc. 2005 Product Catalog (Music Stand Edition).
International Application No. PCT/US2004/043990, Written Opinion dated Nov. 30, 2006.
International Application No. PCT/US2004/043990, Search Report dated Nov. 30, 2006.
Office Action for parallel Chinese Application No. 20048004 dated Jan. 9, 2009.
Office Action for parallel Chinese Application No. 20048004 dated Sep. 11, 2009.
Office Action for German Design Application No. 40407357.3 dated Feb. 11, 2005.
Certificate of Registration for German Design Patent No. (Application No. 40407357.3) dated Mar. 18, 2005.
Office Action for Japanese Design Application No. 2005-26 dated Jun. 24, 2005.
Certificate of Registration for Japanese Design Registration No. 1258426 (Application No. 2005-26) dated Nov. 4, 2005.
English translation of Office Action for parallel Japanese patent application No. 2007-549334 dated Aug. 10, 2010.

* cited by examiner

MUSICAL INSTRUMENT SUPPORT METHODS AND APPARATUS

This application is the United States National Stage of International Application No. PCT/US2004/043990, filed Dec. 30, 2004, said international application hereby incorporated herein by reference.

TECHNICAL FIELD

Generally, the inventive technology relates to item support methods and apparatus. Specifically, it relates to methods and apparatus which can support an item (including but not limited to musical instruments such as a keyboard) in a desired spatial position and with adequate support against anticipated load(s). Certain embodiments may be collapsible into a storage configuration for efficient storage and/or convenient transport of the support apparatus. Some embodiments may achieve an efficient yet strong design with risers generally forming a "V" shape when the apparatus is in its final deployed configuration.

BACKGROUND

The desire to support items has been known in some industries for many years. In a basic form, the concept may involve a readily deployable and collapsible support stand that is able to accommodate and support anticipated loads. In the musical instrument support stand industry, particular attention has been paid to development of apparatus that are collapsible into a storage configuration and later deployable into an operational configuration, perhaps compatible with a variety of differently sized items (e.g., a variety of differently sized keyboards). The collapsibility feature has evolved, of course, at least in part from the need for musicians to set up stage, perhaps at a different venue each evening. Because compatibility may be a desired feature of some stands, the music industry has developed several stands that have adjustable support structures.

Particularly where a supported item is used while it is supported by the stand (e.g., a keyboard), adjustability of a stand may be a desired feature (e.g., to accommodate different users' heights). Additionally, it may even be that a keyboard player who plans to aggressively play a high pitched percussive piece would want a broader support base than a similarly sized player playing a less aggressive piece substantially at the center of the keyboard. These and other facets relative to musicians and the instruments they play make an ability to change certain features of a deployed stand to accommodate different users, styles and instruments a desired, albeit unnecessary, stand feature.

DISCLOSURE OF INVENTION

The present inventive technology includes a variety of aspects which may be selected in different combinations based upon the particular application or needs to be addressed. In one basic form, the inventive technology discloses a novel, easily deployable stand for an item such as a musical instrument (e.g., a keyboard) to be supported in a certain spatial position. In at least one embodiment of the invention, two risers and two feet may be retained to a base from which they may diverge, resulting in an efficient yet strong design.

Although a key application of the present inventive technology is musical instrument support (of keyboards, or turntables and related gear used by a scratch DJ, as but two examples) there are considerable other applications of embodiments of the inventive apparatus. For example, certain embodiments of the apparatus may be able to support a tabletop or a work surface.

Naturally, further objects of the inventive technology are disclosed throughout other areas of the specification and claims.

MODE(S) FOR CARRYING OUT THE INVENTION

Figure 1:
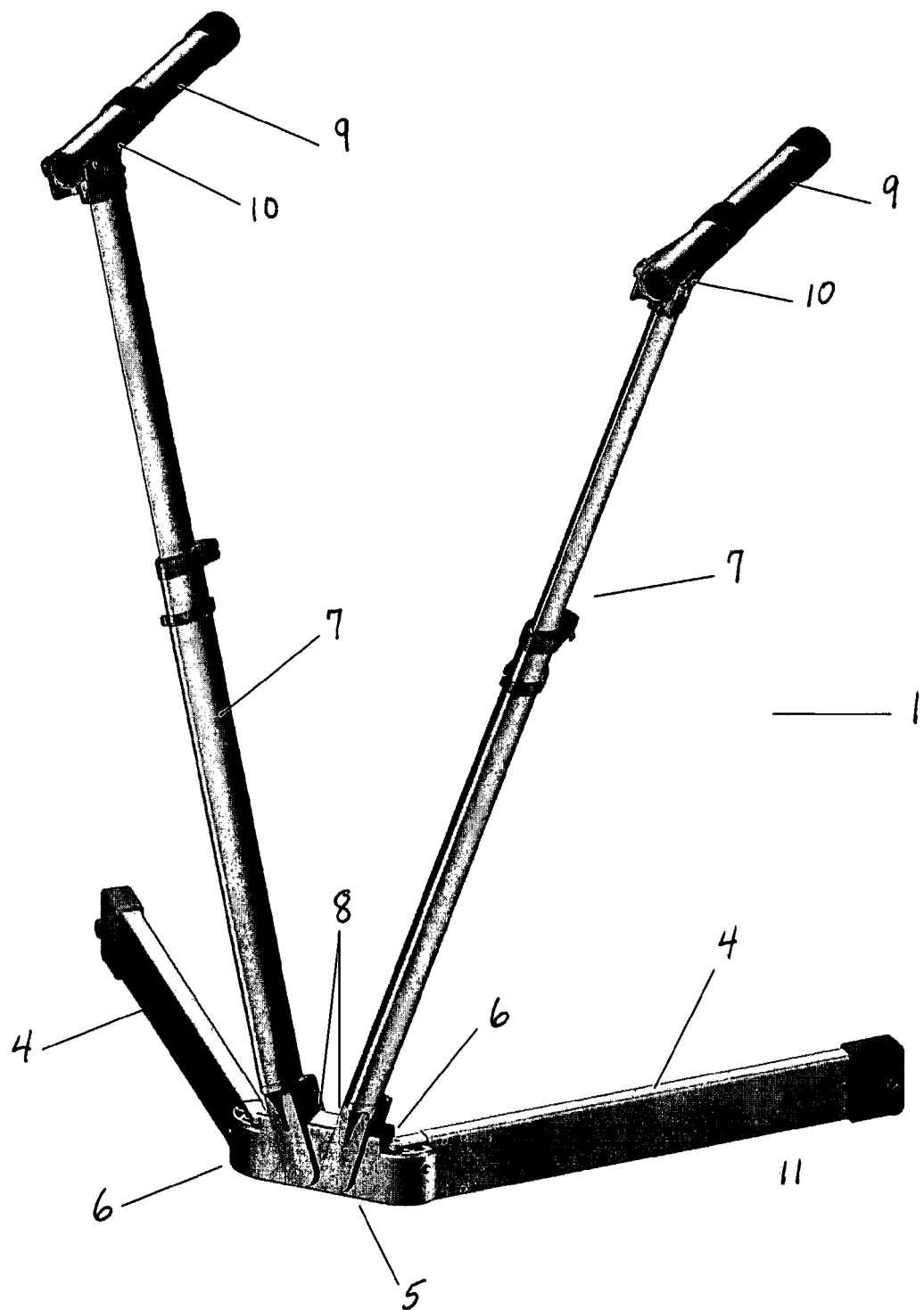
FIG. 1 shows an embodiment of the item support apparatus.
Figure 2:
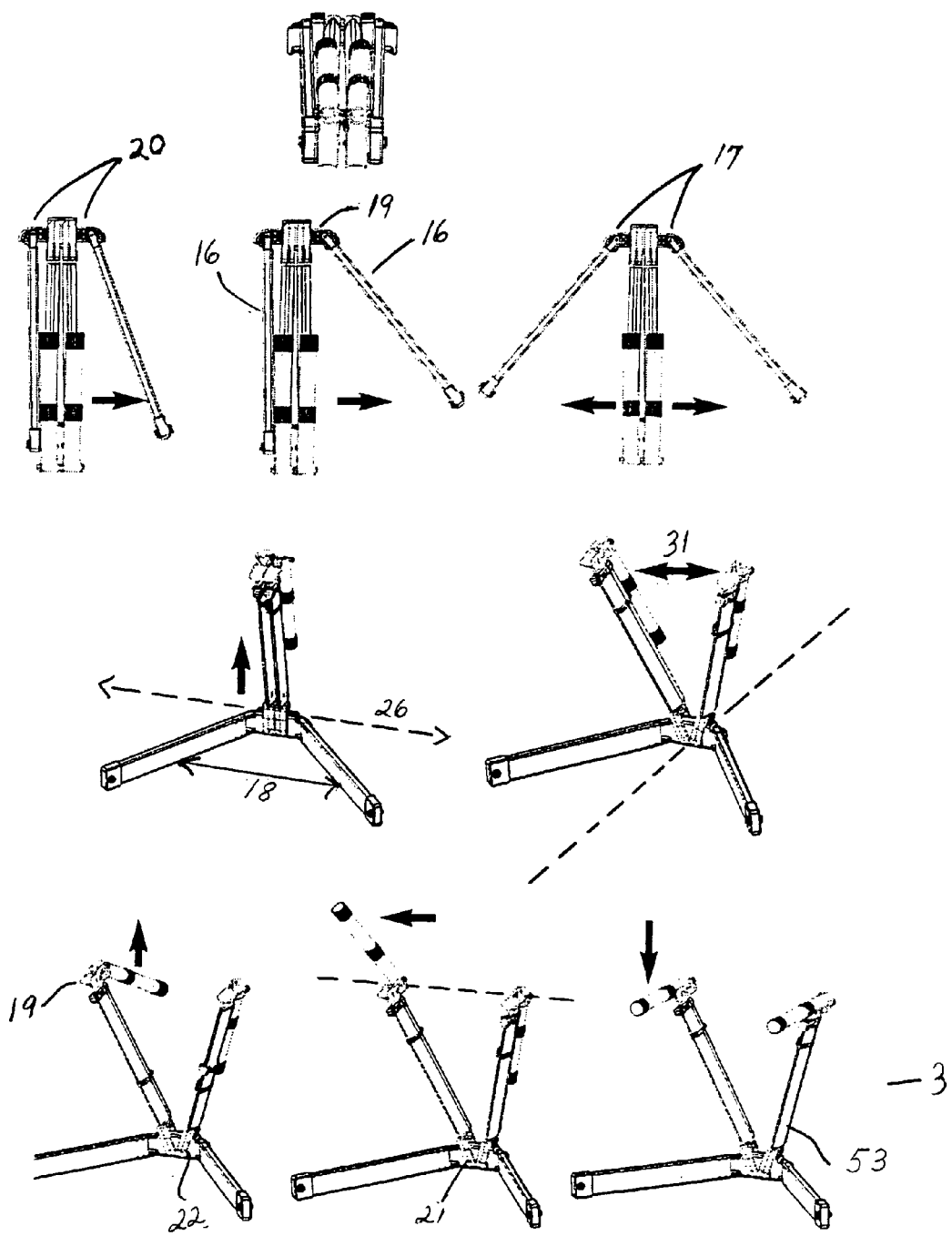
FIG. 2 shows steps of a method of deploying the item support apparatus.
Figure 3:
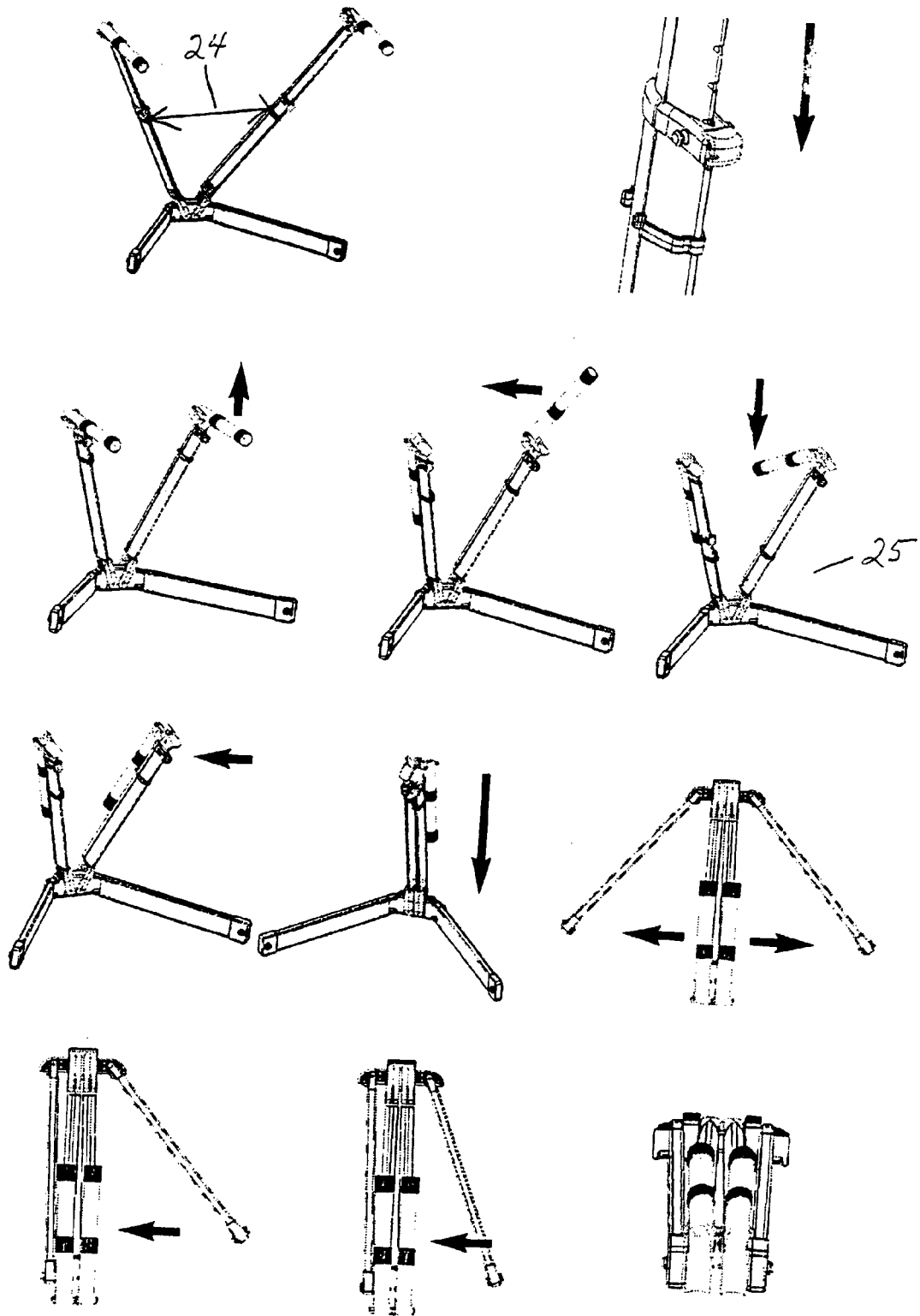
FIG. 3 shows steps of a method of collapsing the item support apparatus.
Figure 4:
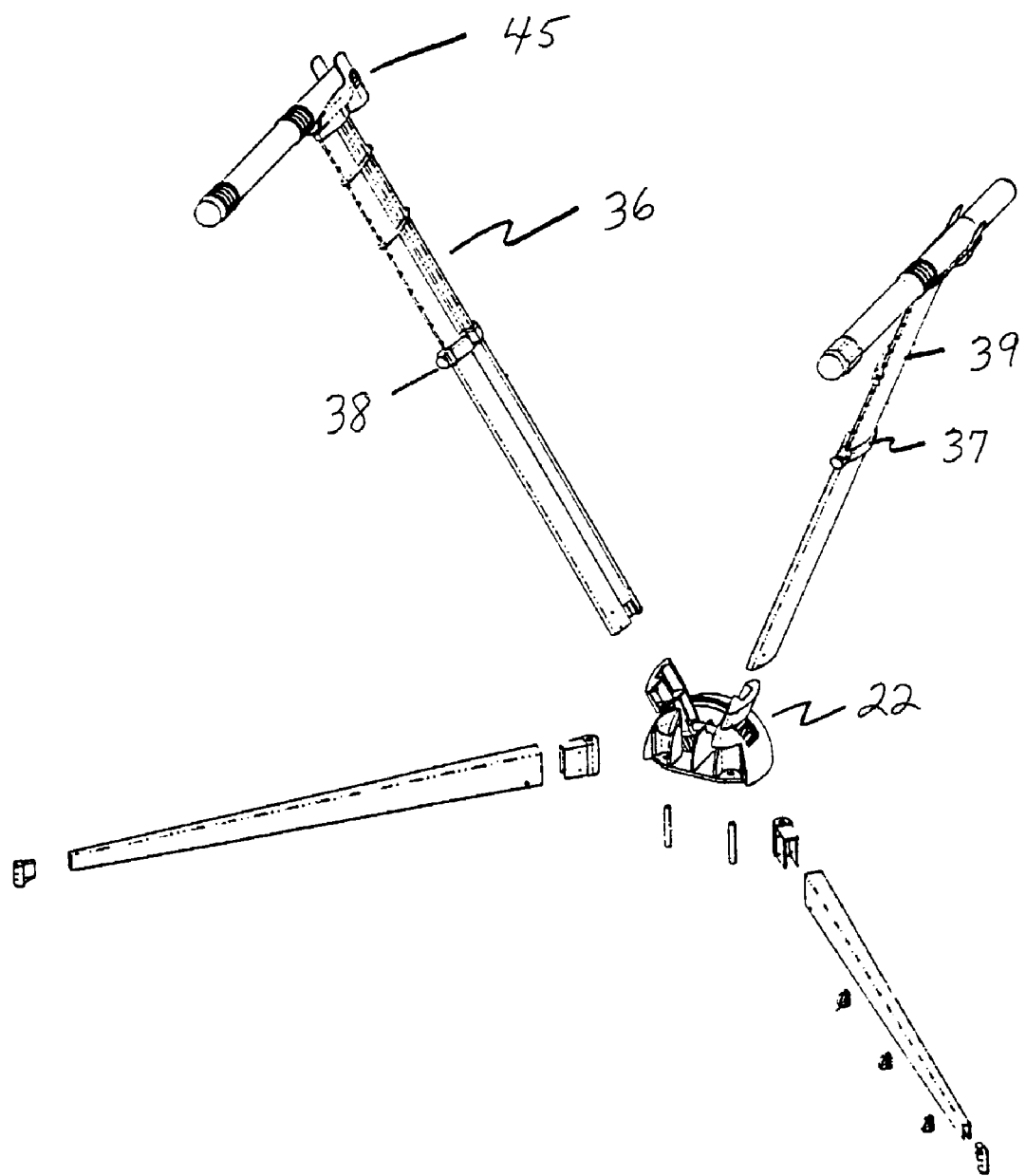
FIG. 4 shows an exploded view of an embodiment of the item support apparatus.
Figure 5:
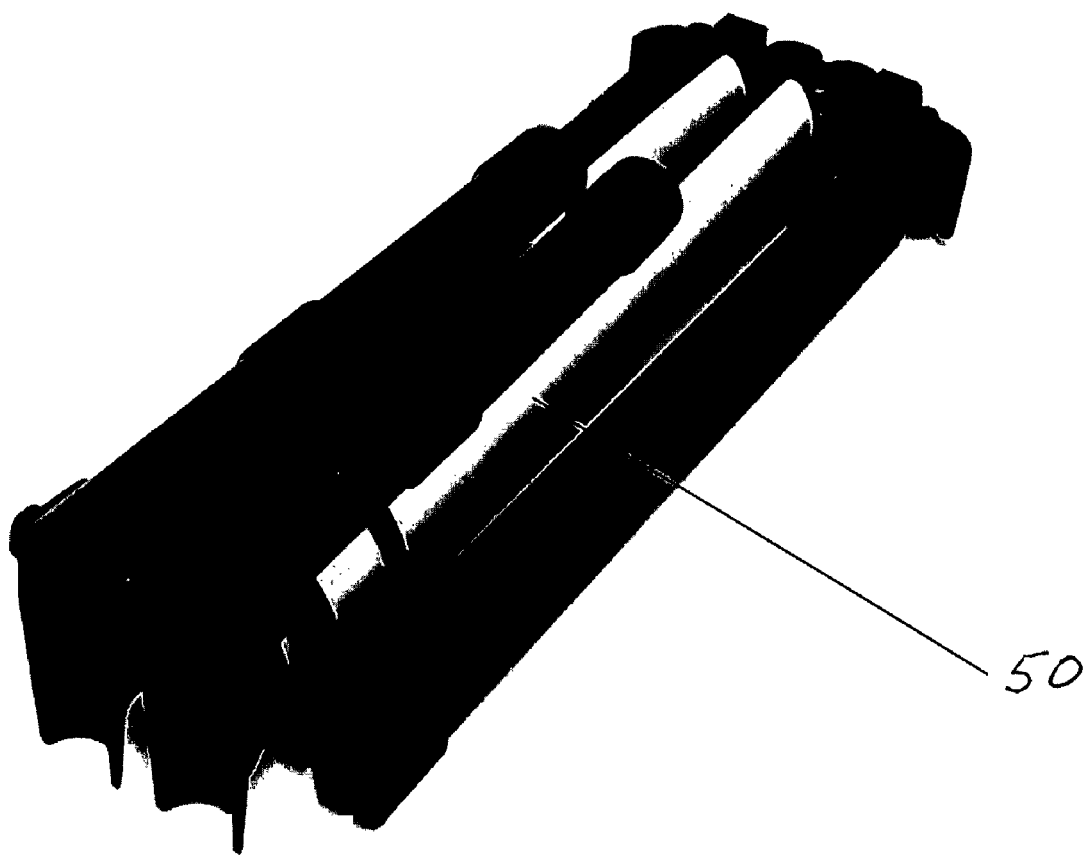
FIG. 5 shows an embodiment of the item support apparatus in storage configuration.

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should further be understood to support and encompass descriptions and claims of all the various embodiments, systems, techniques, methods, devices, and applications with any number of the disclosed elements, with each element alone, and also with any and all various permutations and combinations of all elements in this or any subsequent application.

At least one embodiment of the invention may be an item support apparatus 1 (e.g., a musical instrument support apparatus 2 such as a keyboard support apparatus 3) that comprises at least two feet 4; a base 5 from which said feet extend at a first retention element 6; at least two risers 7 retained to the base by a second retention element 8; and at least one arm 9 retained to each riser by an arm retainer 10.

The term feet refers to those structures, other than the base or the retention elements, which each have at least a portion that contacts an underlying support surface 11 (e.g., a stage floor). Feet can be straight, can be curved in any manner, and can even have one or more portions that do not contact the underlying support surface. Feet or any support member are said to be curved whenever even only a portion thereof is curved. When deployed (e.g., when in a final deployed foot configuration 12), they may exhibit the appearance roughly of a "V" 13 or a "U" 14. Where the retention element that retains the feet to the base extends (e.g., horizontally) from the base, the feet may form the upper segment(s) (which may be straight or curved) of a "Y" 15. In preferred embodiments, each foot contacts a lower support surface at more than one point when in a final deployed foot configuration.

In a preferred embodiment, the feet are pivotally deployable feet 16 and are retained to the base by a pivot retention element 17. The pivotally deployable feet may be rotated in a plane (e.g., a horizontal plane) during deployment of the apparatus during set-up. The feet, in their final deployed foot configuration, may have a foot separation width 18 (e.g., a distance between the midpoints of each of the feet) that characterizes to some extent their degree of "spread" over the underlying support surface.

Figure 10:
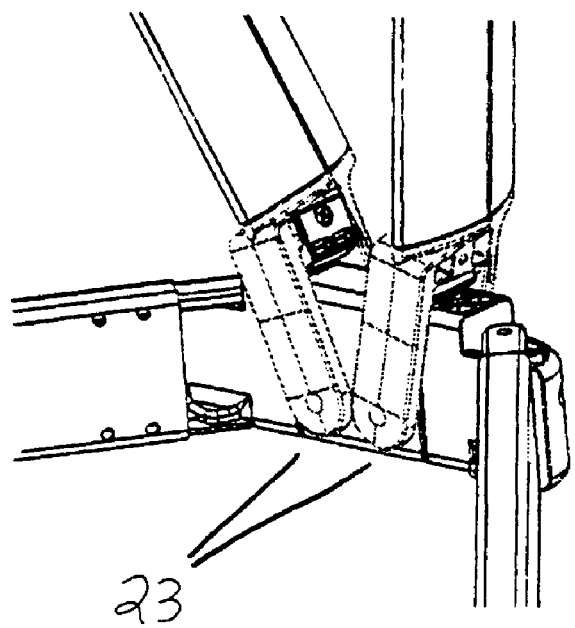
FIG. 10 shows an embodiment of the base, retainers and support members.
Figure 10:
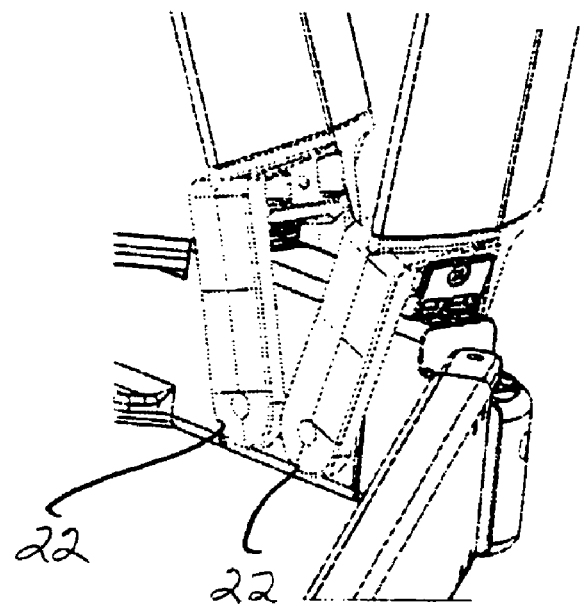
Figure 11:
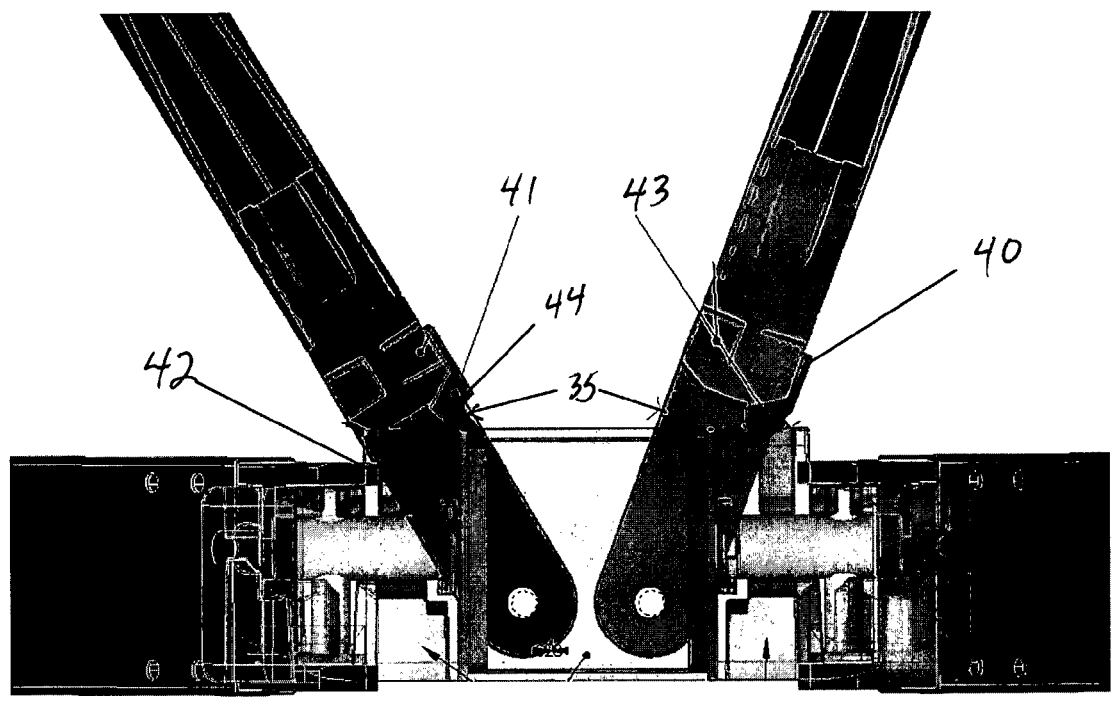
FIG. 11 shows an embodiment of the base, retainers and support members.
Figure 12:
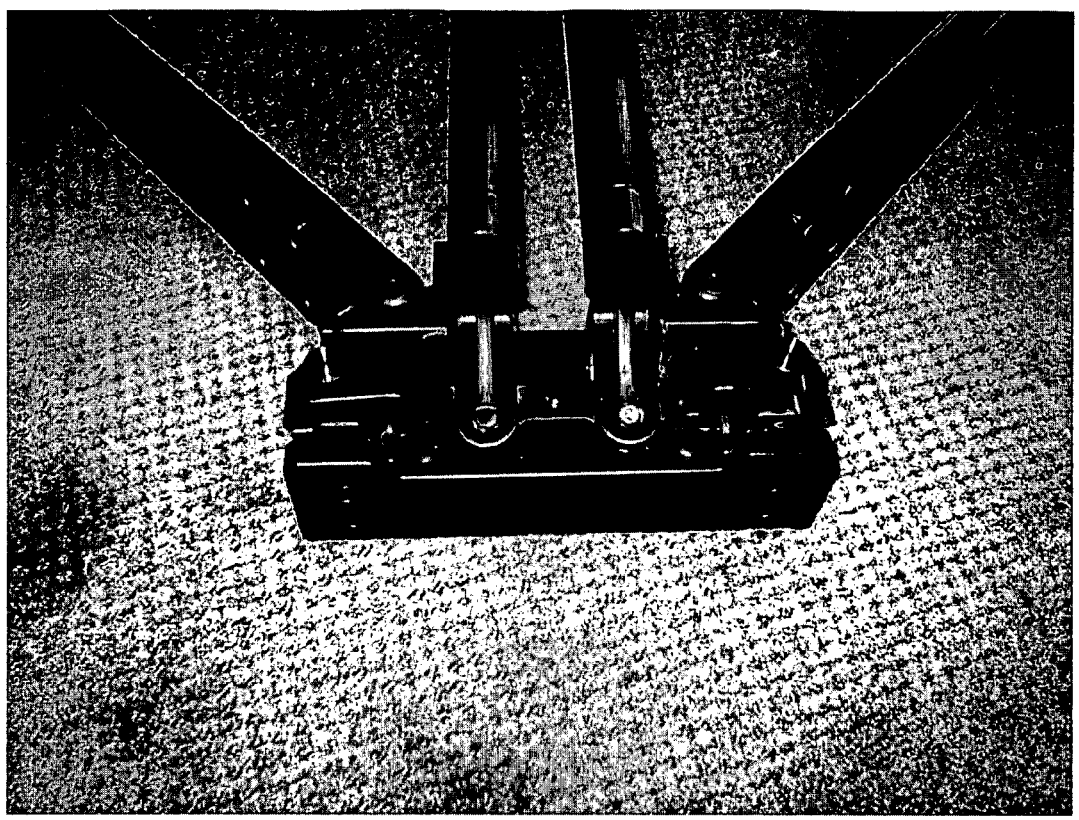
FIG. 12 shows an embodiment of the base, retainers and support members.
Figure 13:
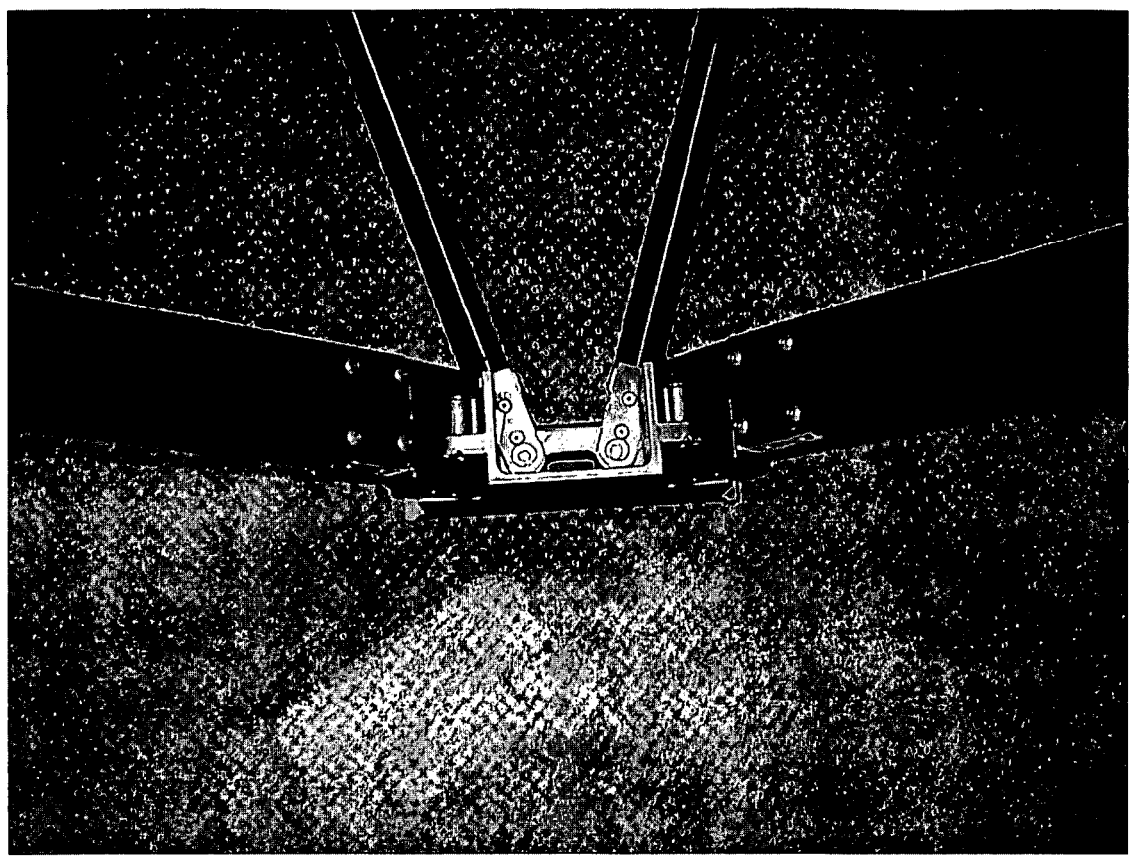
FIG. 13 shows an embodiment of the base, retainers and support members.

The term retention element is a broad term that includes any device, mechanism, structure or apparatus that retains one part or parts to another part or parts. One part can be retained to another part even though a connection between the two may be indirect (e.g., a part A can be retained to part B by an intermediate part C). It includes weld(s), ball and socket joint(s), and devices that allow rotation in only one, or more, plane, as but a few examples. In keeping with the broad definition of the term element (which generally relates to one or more part, mechanism, device, etc. as described), the term retainer element may refer to not only a single retainer 19, but also to a set or group of retainers 20. Indeed, certain embodiments of the inventive technology include retention elements that each include two retainers. A retainer element can be a weld(s), a ball- and socket joint, and/or those pivot retainers 21 that each enable rotation about a single axis. The retainers of one retention element may be established between the retainers of another retention element (see FIG. 10, e.g.).

In certain embodiments, the retainers are pivot retainers 22 (or the retainer elements are pivot retainer elements 23) in that they allow some type of rotational motion of the retained part about one or more axes in addition to retaining the part(s). Particularly in those embodiments whose feet form parts of a "Y", the retainer element that retains the feet to the base may extend from the base horizontally (see FIG. 30c and FIG. 30d); in those embodiments where the apparatus in general exhibits a "Y" shape (in its deployed configuration and when viewed from the front or rear), the retainer element that retains the risers to the base may extend upwards (see FIG. 30a, FIG. 30d and FIG. 30e).

The base may be that element that keeps any two or more of the individual retainers in relative positions such that performance (deployment, support, etc.) of the apparatus is not compromised. In preferred embodiments, foot and riser retainers are held by the base in fixed position relative to each other (of course, retainers so held can still enable rotation of a part(s) retained as intended). However, designs in which at least one retainer is translatable (within limits) relative to another retainer are also within the ambit of the inventive technology. It should be noted that in a preferred embodiment, when the apparatus is in a final deployed configuration, the base rests on an underlying surface instead of being suspended above the underlying surface, although certainly a design where feet ascend to a suspended base are within the ambit of the inventive technology. In preferred embodiments, when the apparatus is in a final deployed configuration, the base may be established substantially on an underlying surface. Certain embodiments may have a comprehensively compact base (e.g., as shown in FIG. 30a, FIG. 30b, FIG. 30e, FIG. 31b and FIG. 31c), or merely a width compact base (see, e.g., FIG. 30c and FIG. 30d), or merely a depth compact base (see, e.g., FIG. 30f and FIG. 30a).

The term riser includes at least some of the apparatus parts that ascend (e.g., from the base) and provide to the arms all or at least most of their elevated position when the apparatus is in a final deployed configuration (see FIG. 1, e.g.). Of course, their ascension from the base need not be perfectly vertical but need only have a vertical component (i.e., be upwards). They may be straight or curved, and, in certain embodiments, form a "V" or "U" shape when in their final deployed configuration as viewed from the front or rear of the apparatus (e.g., when viewed "straight on"). Risers can be retained by a retainer element that extends upwards from the base, thereby lending a "Y" shape to the apparatus. However, in preferred embodiments, the retention element that retains the risers to the base does not extend significantly upwards and the risers have a "U" or a more preferred "V" shape.

It should also be noted that in preferred embodiments, and in a final deployed apparatus configuration, risers may be said to angle outwards from each other at the base such that a horizontal distance 24 between them increases as a distance from the base increases. In at least one embodiment, risers do not intersect 25, where an X shape is defined as intersecting (note that intersection may be achieved even where one riser crosses immediately behind another but the two do not touch). A substantially "V" shape appearing apparatus may have non-intersecting risers.

Figure 7:
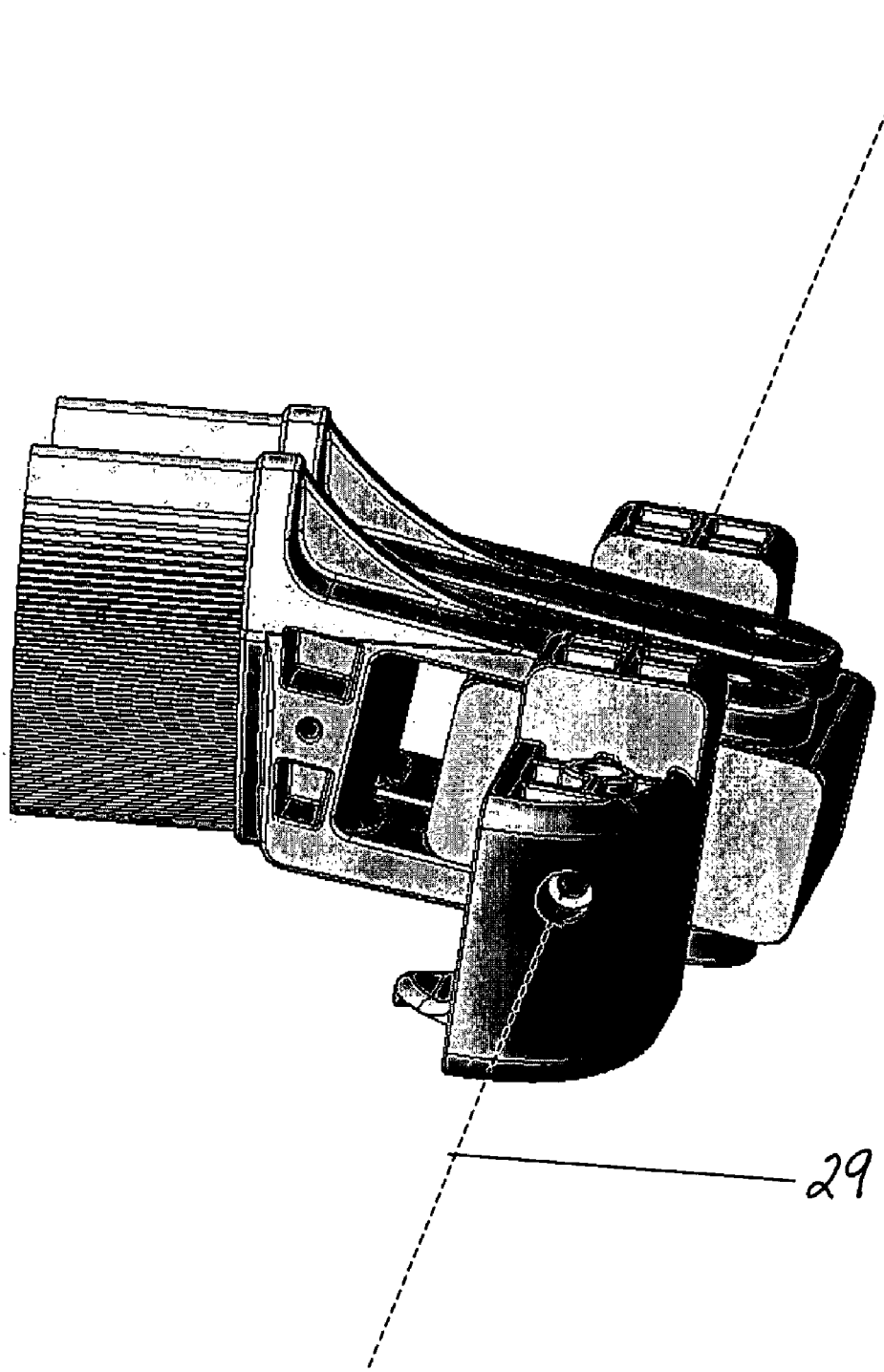
FIG. 7 shows an embodiment of the base and retainers.
Figure 8:
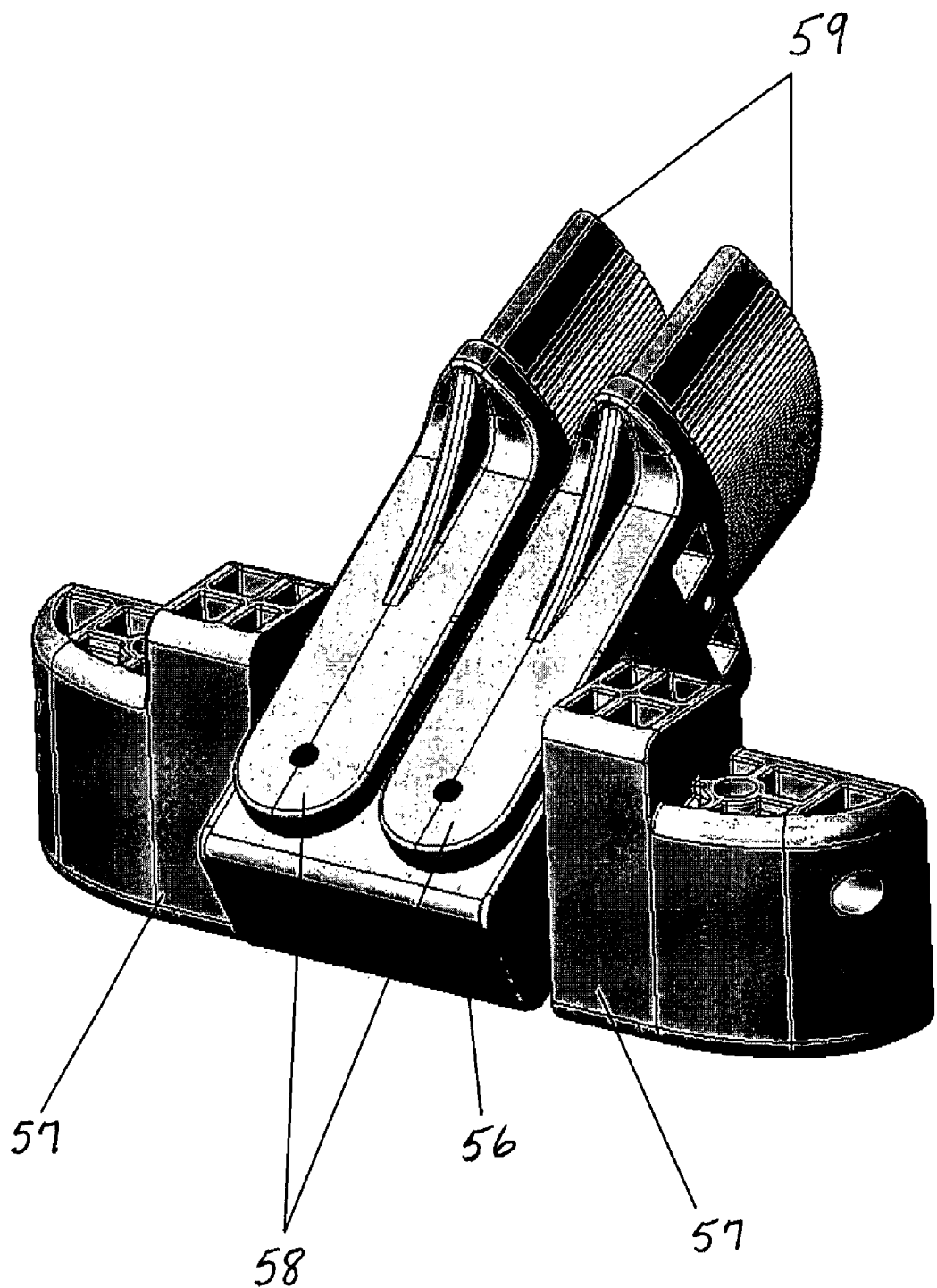
FIG. 8 shows an embodiment of the base and retainers.
Figure 9:
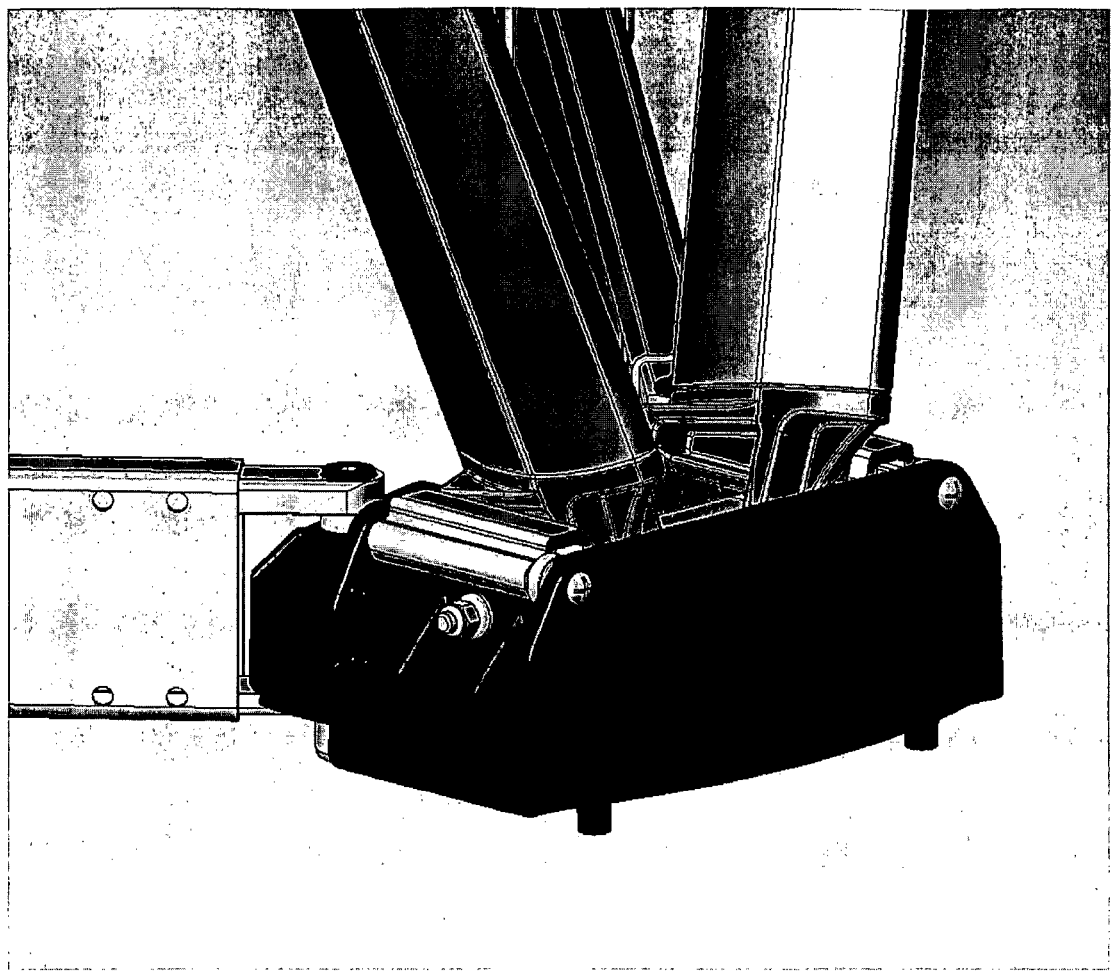
FIG. 9 shows an embodiment of the base, retainers and support members.
Figure 14:
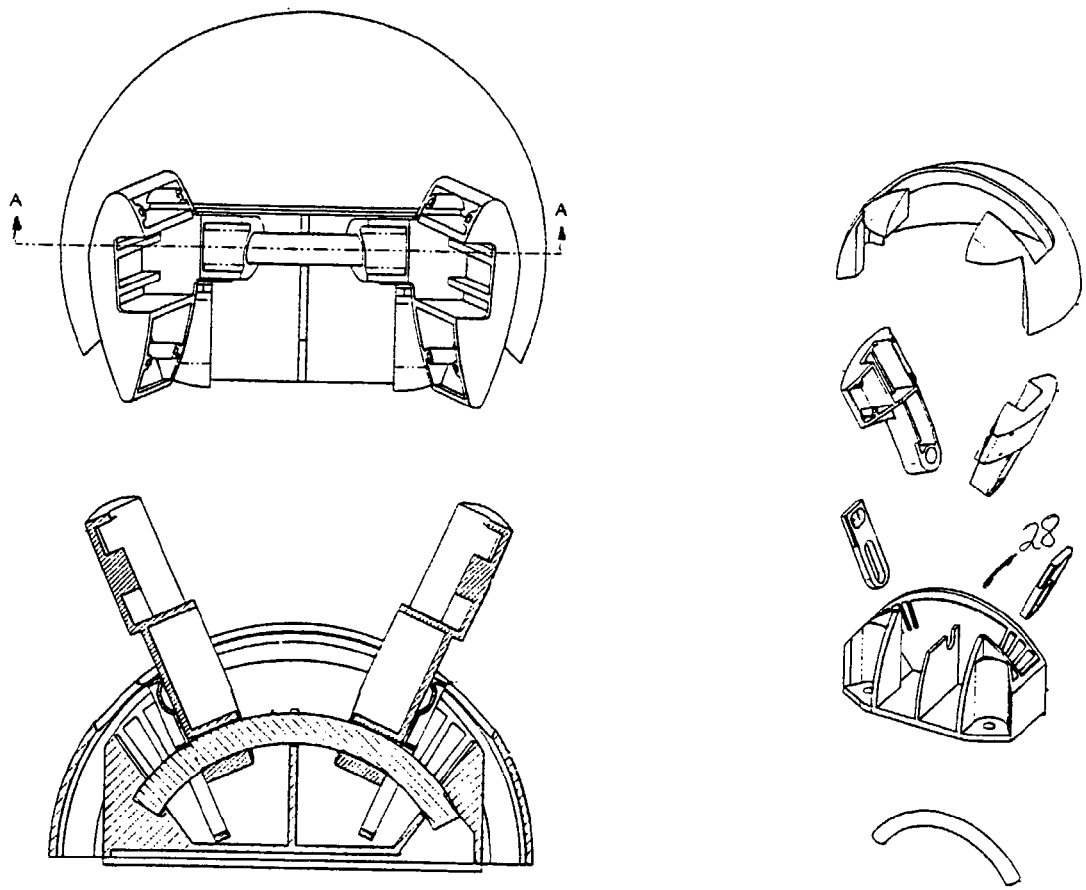
FIG. 14 shows views of an embodiment of the base, retainers and support members.
Figure 15:
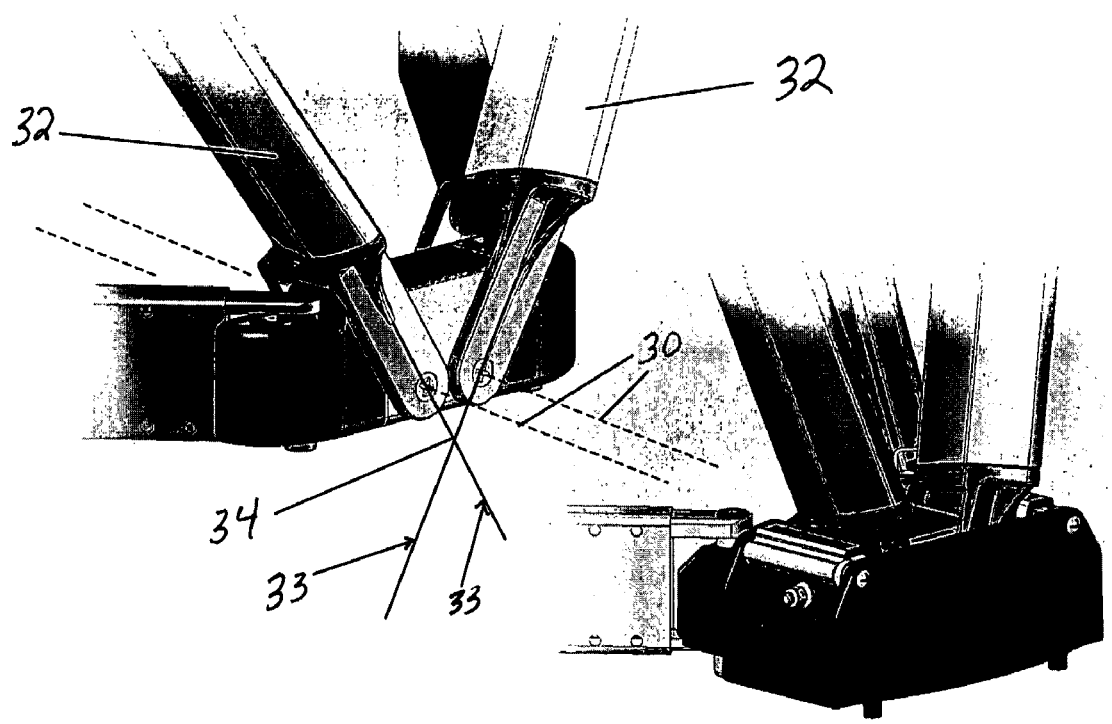
FIG. 15 shows an embodiment of the base, retainers and support members.
Figure 16:
FIG. 16 shows an embodiment of the base, retainers and support members.
Figure 17:
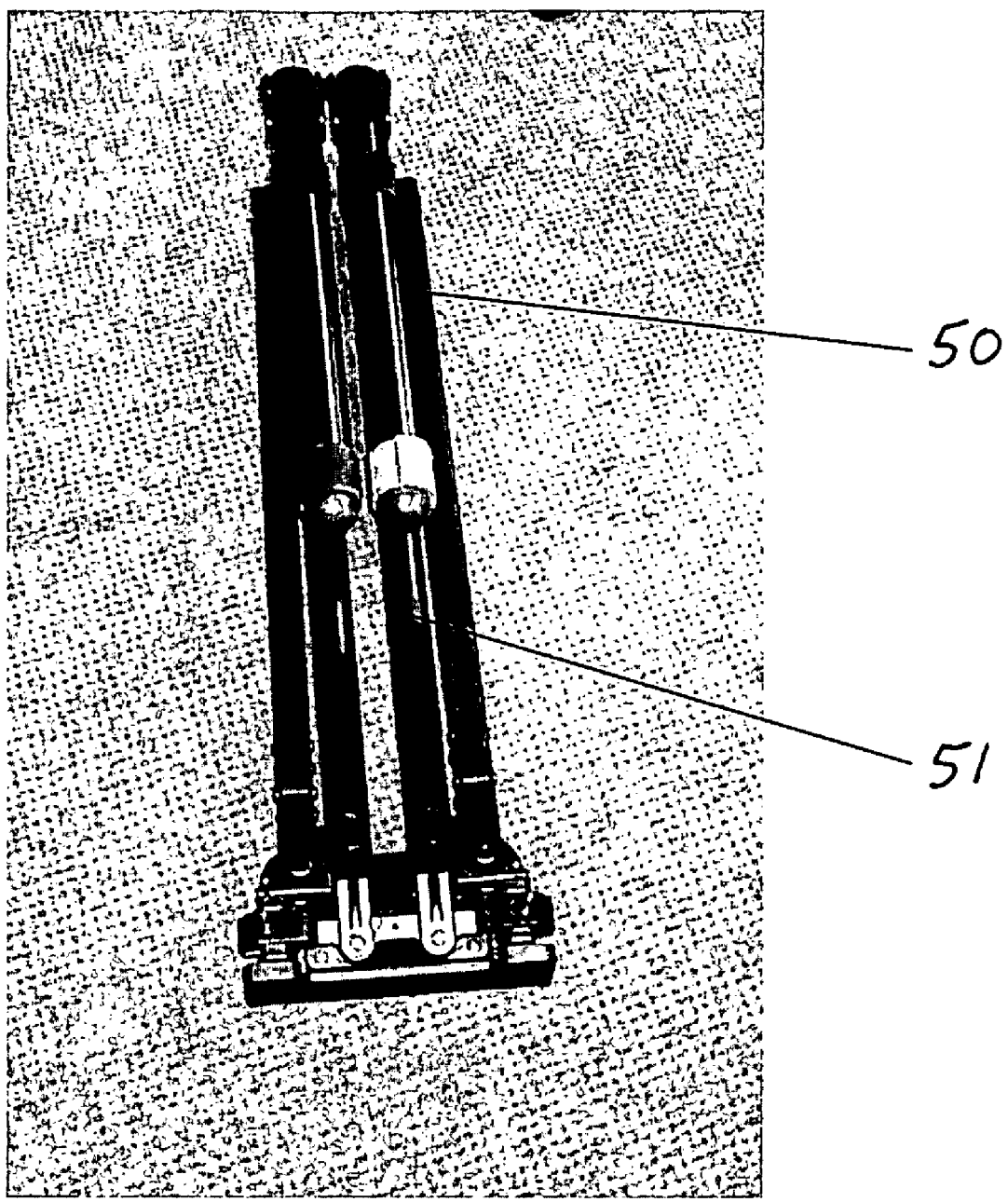
FIG. 17 shows an embodiment of the item support apparatus in storage configuration.
Figure 18:
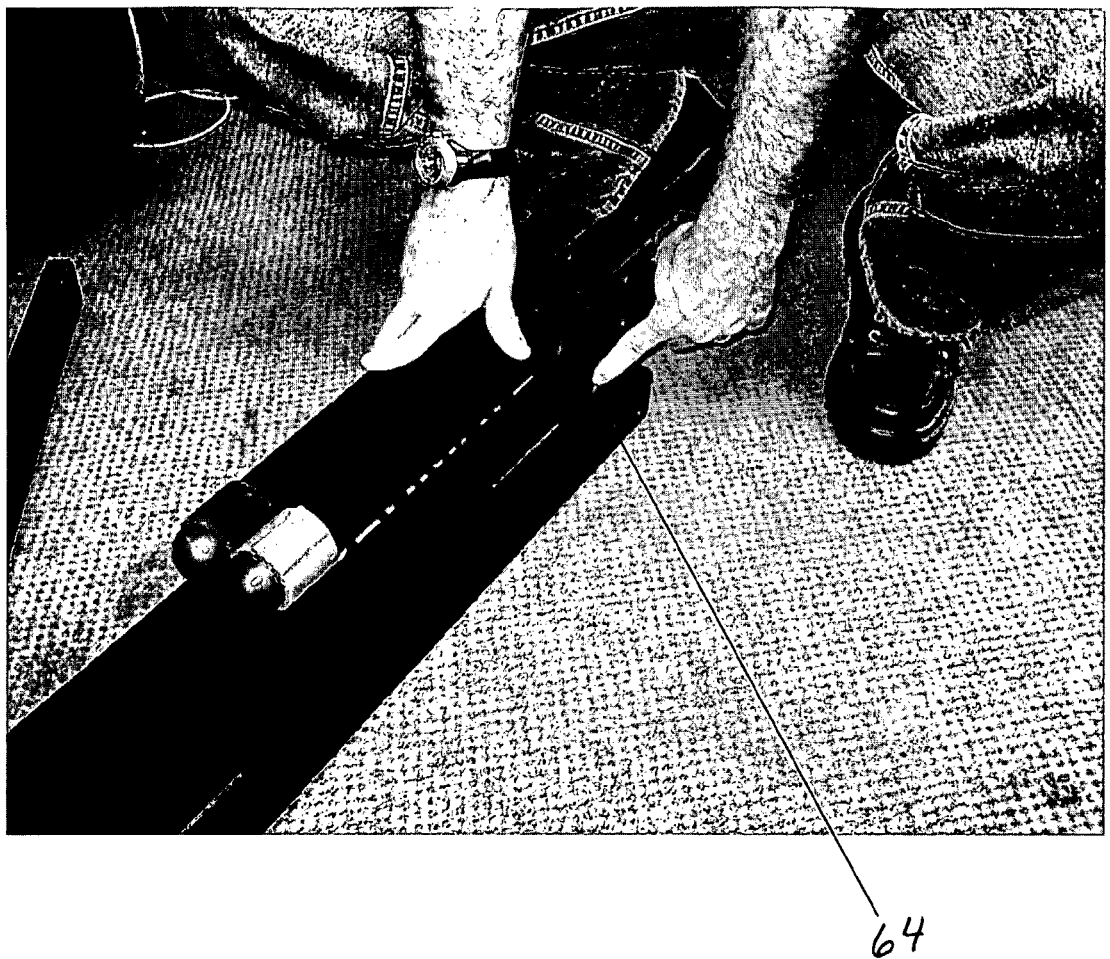
FIG. 18 shows a step in deploying an embodiment of the item support apparatus.
Figure 19:
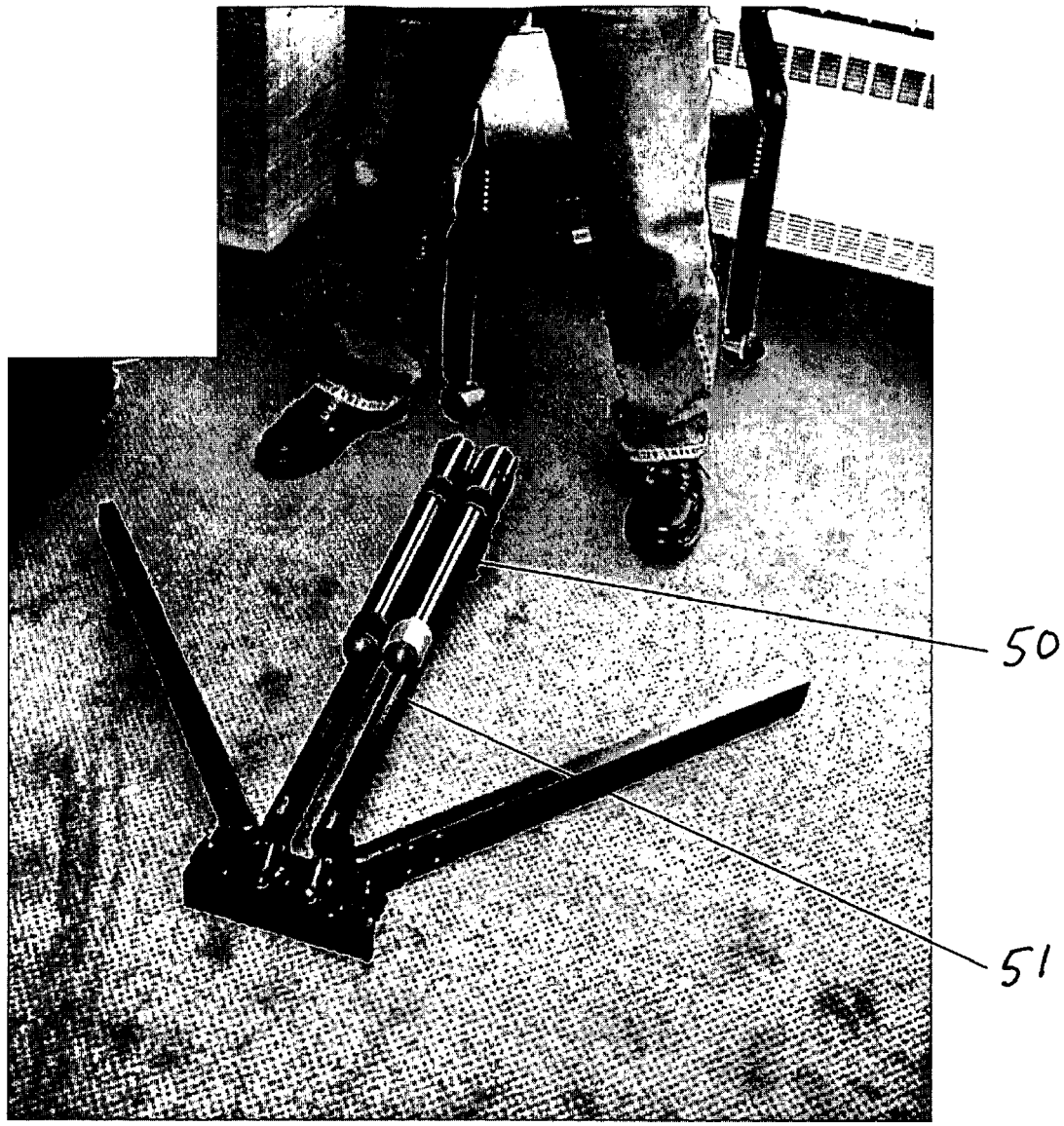
FIG. 19 shows a sequential step in deploying an embodiment of the item support apparatus.
Figure 20:
FIG. 20 shows a sequential step in deploying an embodiment of the item support apparatus.
Figure 21:
FIG. 21 shows a sequential step in deploying an embodiment of the item support apparatus.
Figure 22:
FIG. 22 shows a sequential step in deploying an embodiment of the item support apparatus.
Figure 23:
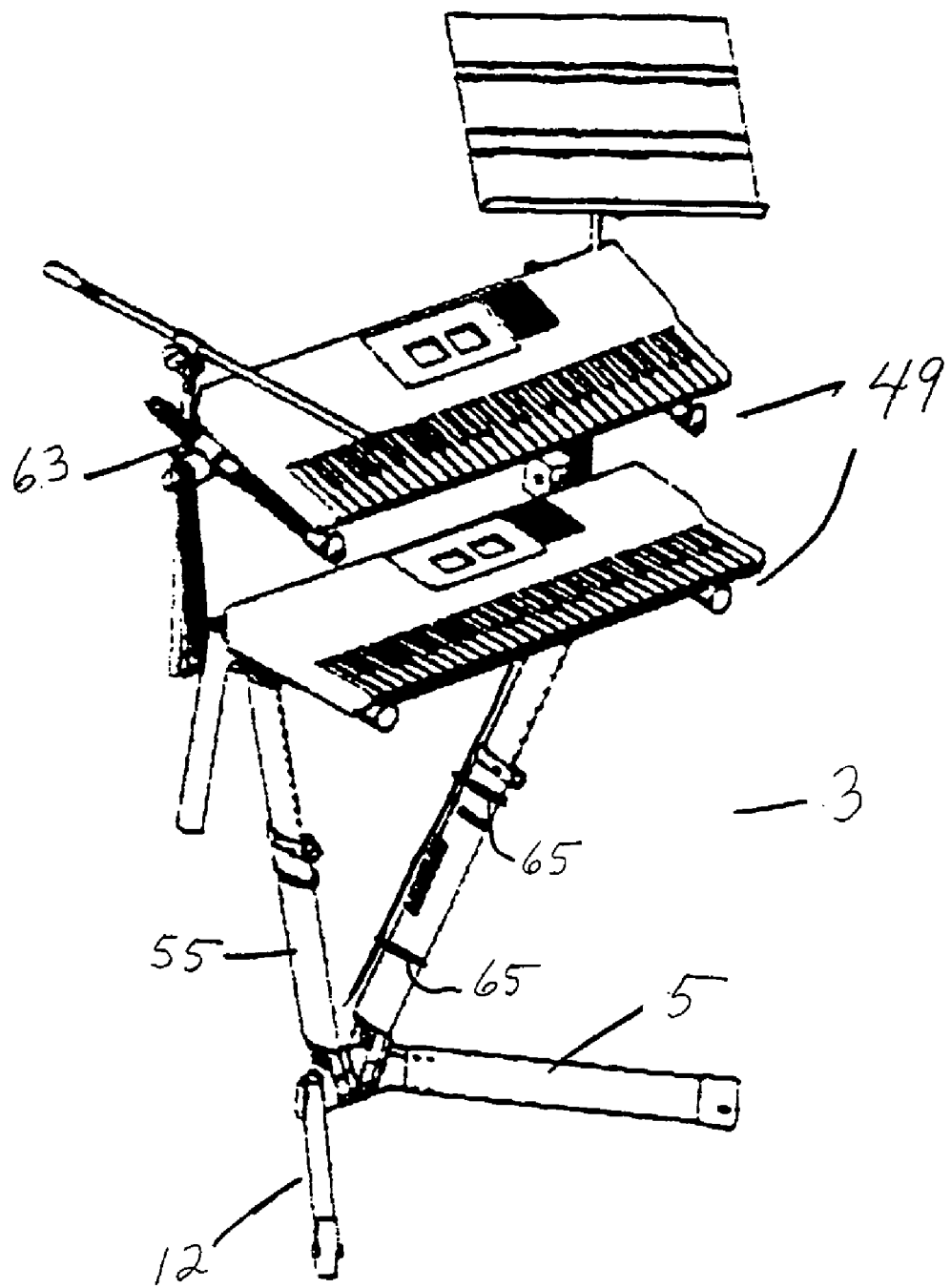
FIG. 23 shows a two-tiered embodiment of a musical instrument support apparatus.
Figure 24:
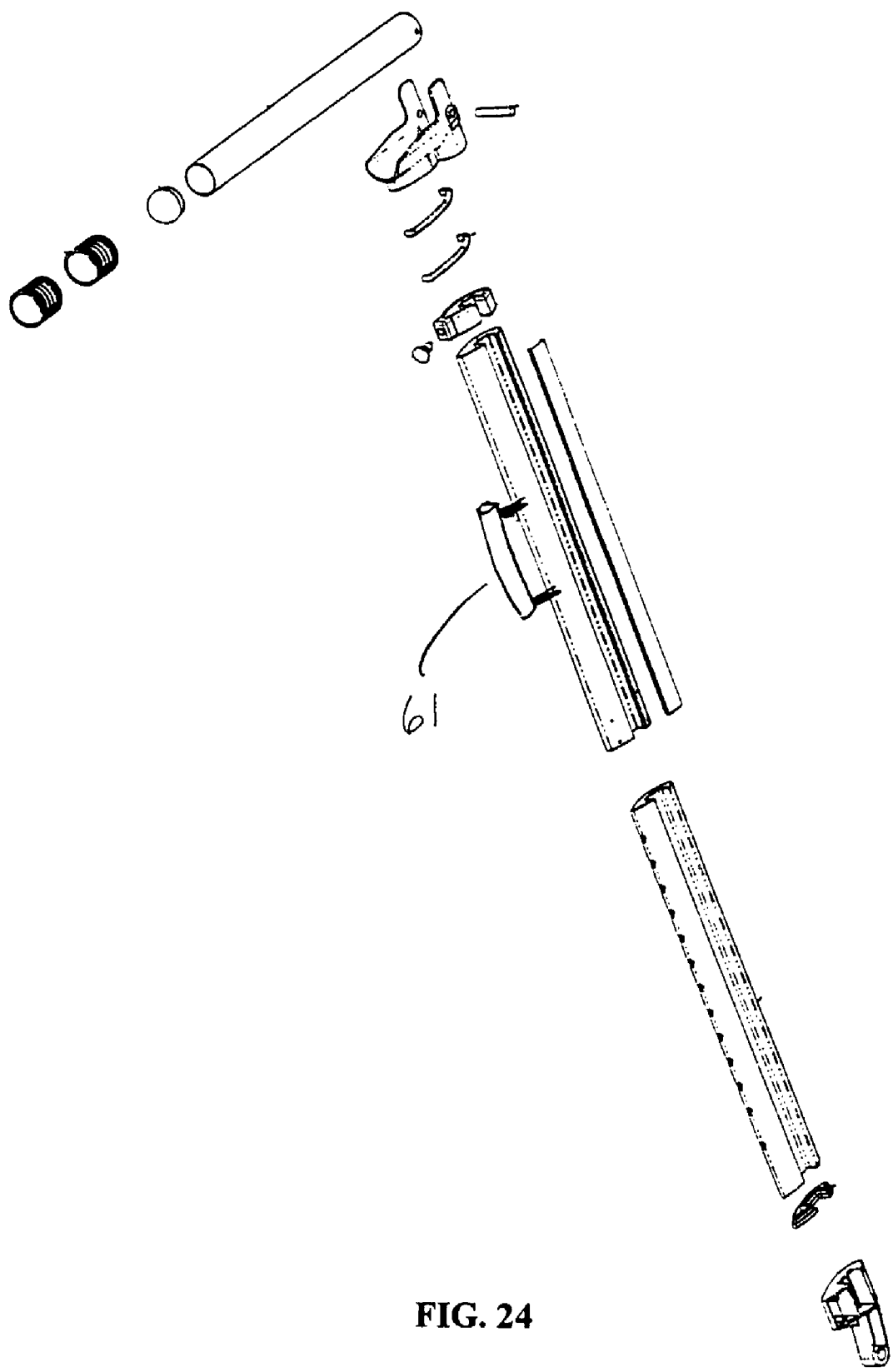
FIG. 24 shows an exploded view of a riser of an embodiment of the item support apparatus.
Figure 25:
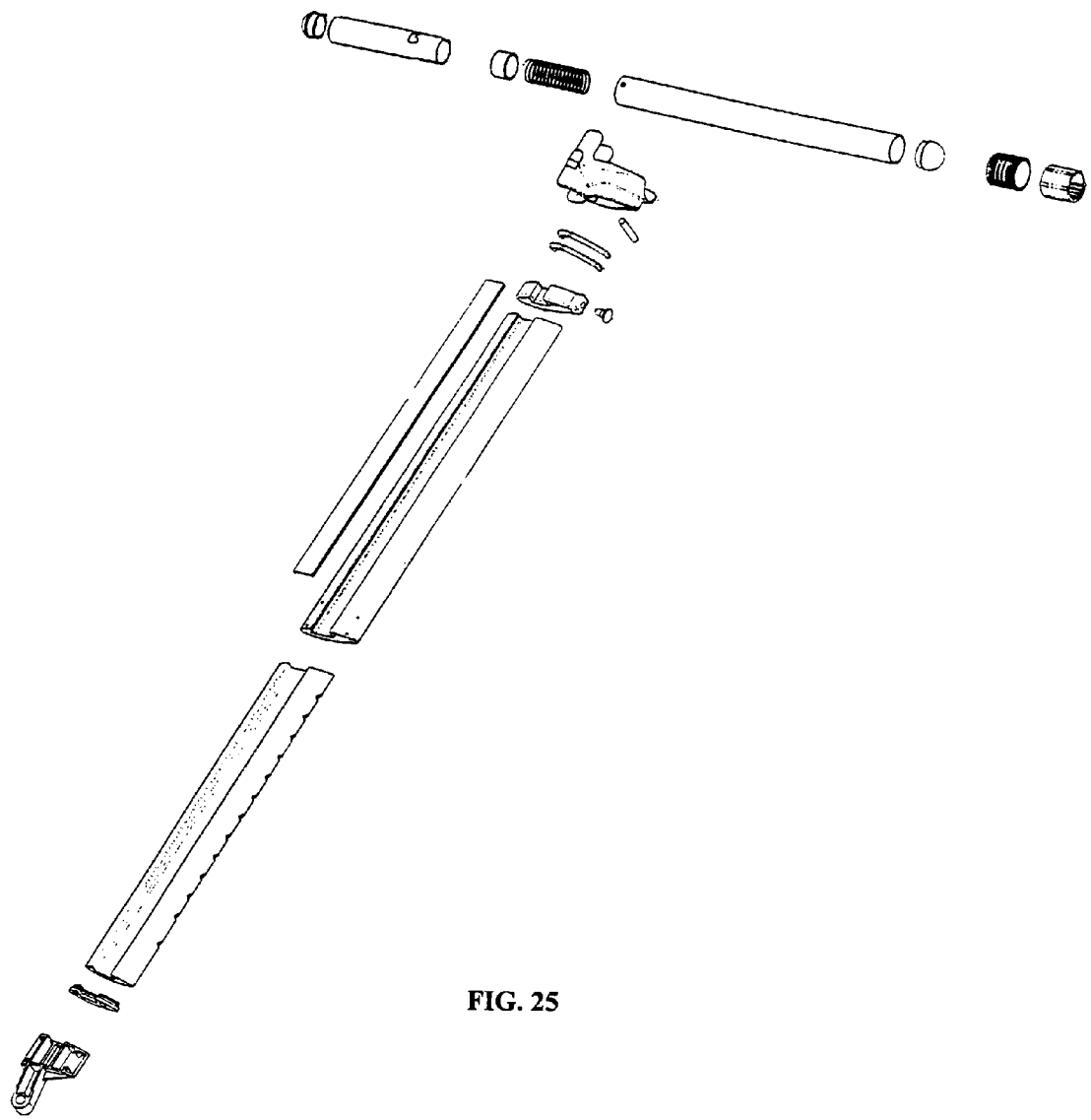
FIG. 25 shows an exploded view of a riser of an embodiment of the item support apparatus.
Figure 26:
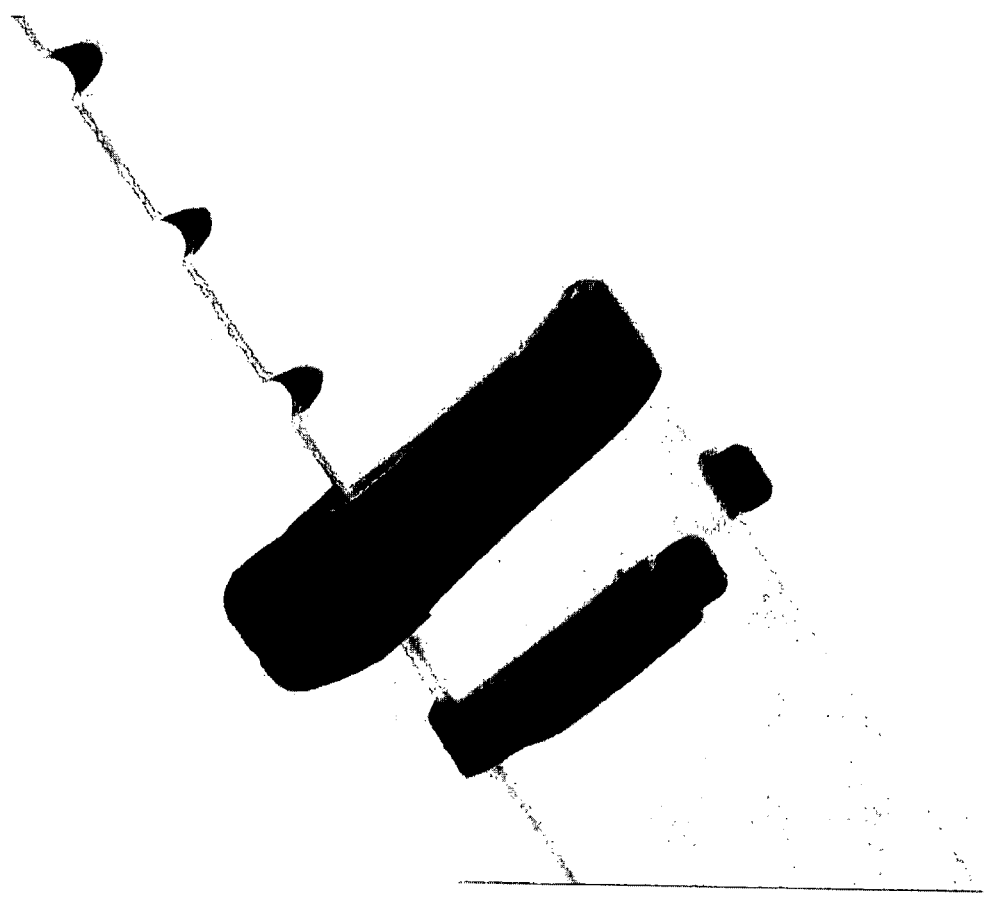
FIG. 26 shows a close-up of a collar lock of an embodiment of the item support apparatus.
Figure 27:
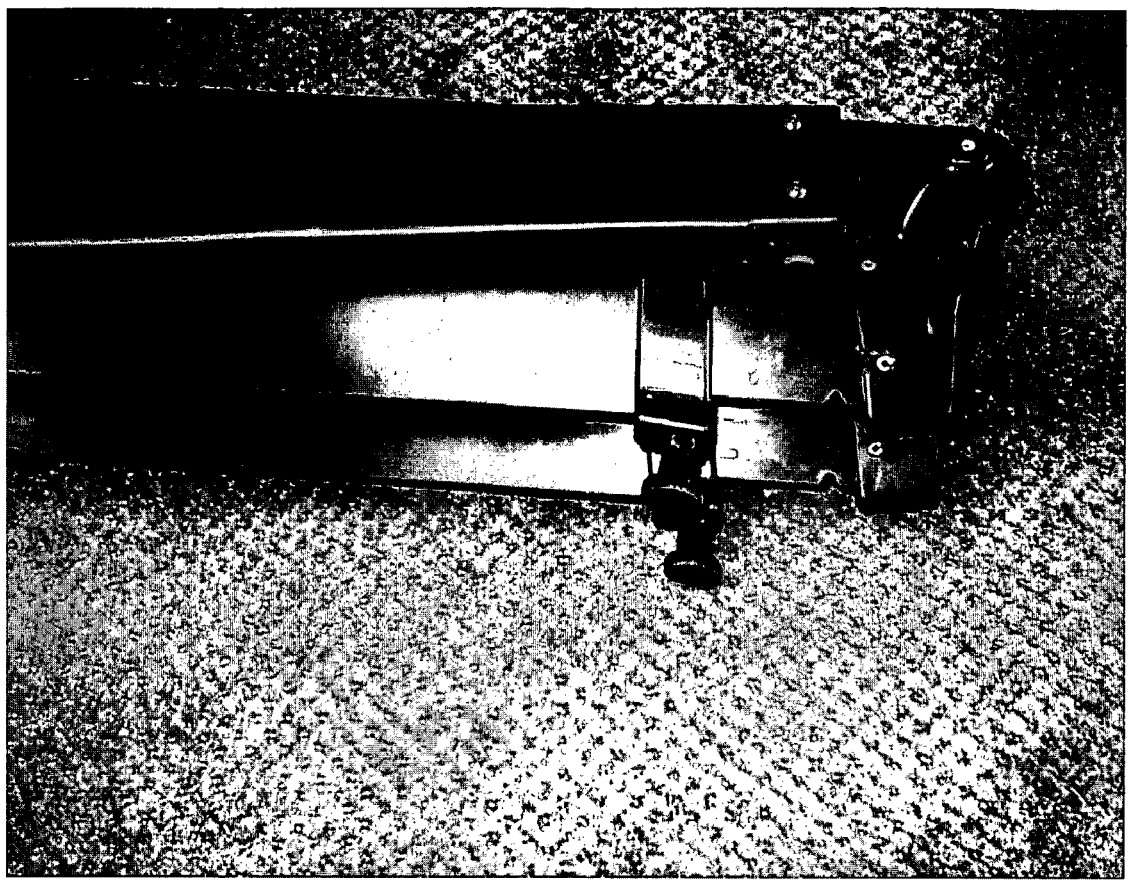
FIG. 27 shows knobs of a collar lock of an embodiment of the item support apparatus.
Figure 28:
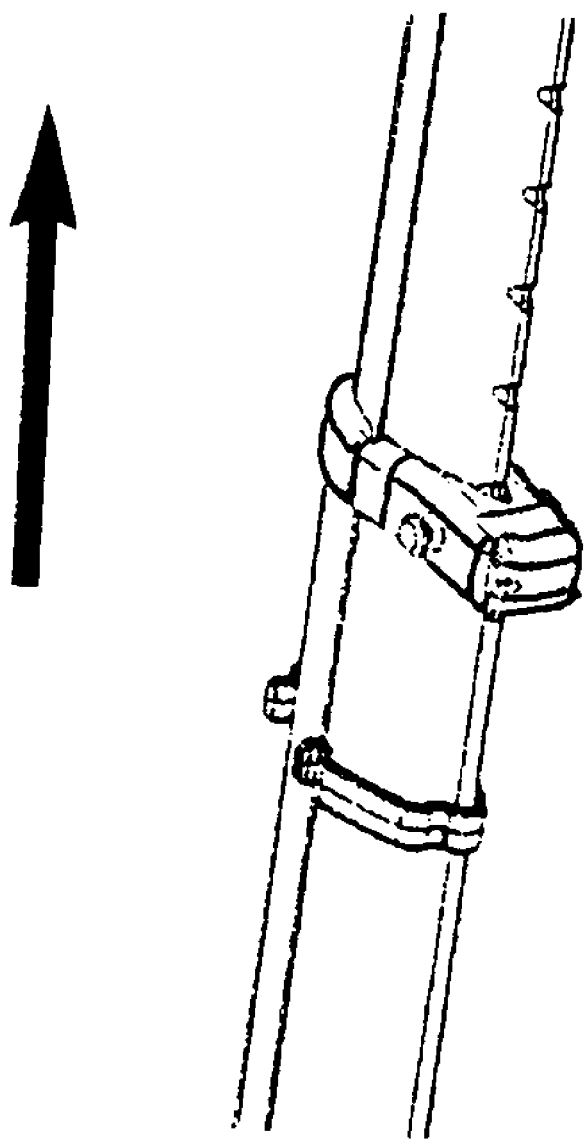
FIG. 28 shows a telescoping retainer of an embodiment of the item support apparatus.
Figure 29:
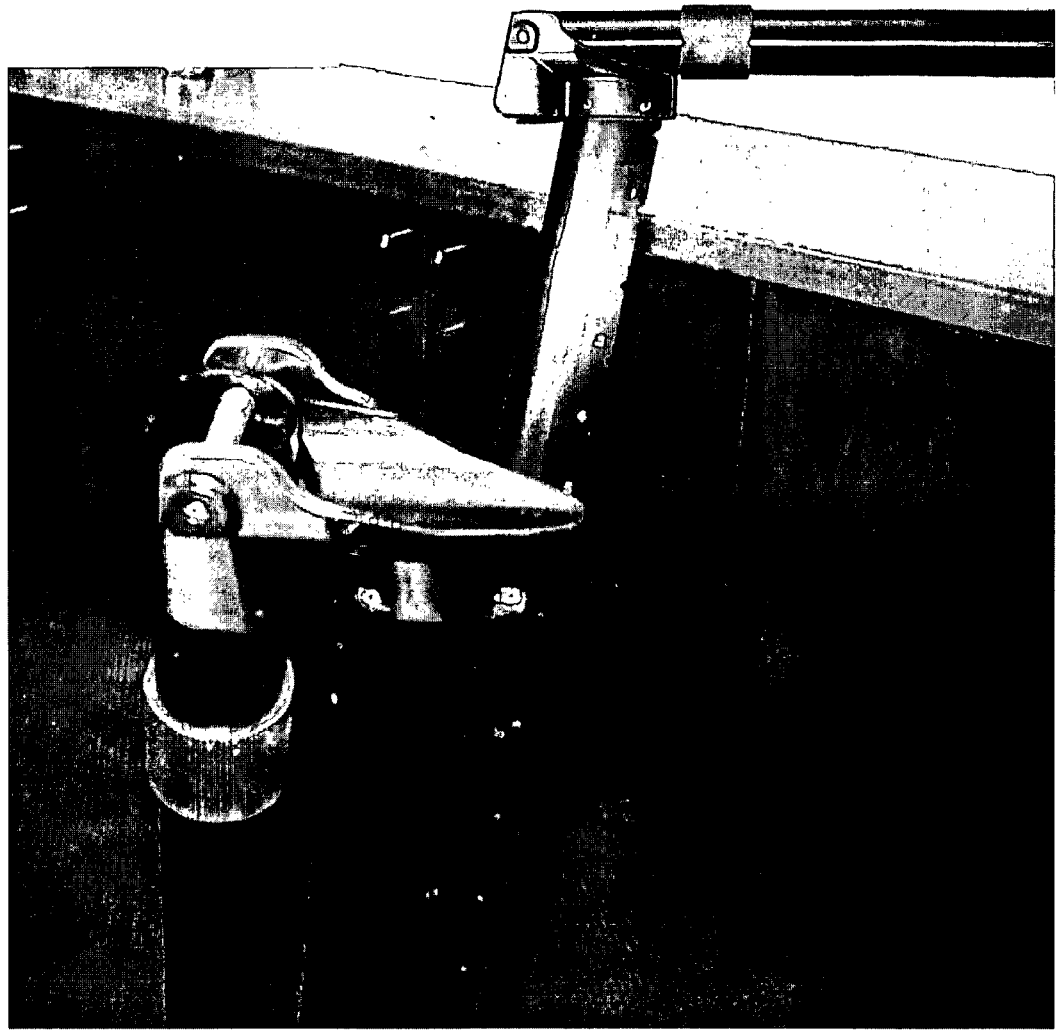
FIG. 29 shows arm retainers of an embodiment of the item support apparatus.

In at least some embodiments of the invention, pivotally deployable risers may be rotatable about two axes 26, 27 to enable, e.g., deployment of the apparatus. Such multi-axis rotation may be afforded entirely by a certain type of pivot retention element (that enables rotation about two axes consecutively 28 (preferred) or simultaneously (as in a ball and socket joint)). Again, such pivot retention elements may include ball and socket retainers, or retainers that allow rotation (e.g., consecutive rotation) about different axes as shown in FIG. 14, as but two examples. In other embodiments, however, such multi-axis rotation may be afforded by a pivot retention element (e.g., that allows rotation about one axis) established at a first part of the base (to which the pivot retention element may be retained) that is rotatable relative to a second part of the base (see FIG. 7, e.g.). In such other embodiments, such a base design may allow rotation about a first axis 29 (e.g., a horizontal axis) to enable substantial elevating of the risers, and, after such elevation is obtained, the obstruction to rotation about a different axis 30 (e.g., one that is orthogonal to the immediately aforementioned horizontal axis) is no longer in an interfering position and a "splitting" 31 (e.g., angling outwards) of the risers may now be possible. In certain embodiments, a pivotally deployable riser is rotatable about at least one axis that is different from (e.g., orthogonal to) the axis about which the pivotally deployable feet may rotatable.

In at least one embodiment, risers may each have a lower terminus 32 at which each is pivotally retained by a pivotal retention element, in addition to a lower projection 33 (e.g., an imaginary line extension of a line such as a centerline, or a translation thereof, characterizing a riser) each of which is below a respective lower terminus (i.e., a lower terminus of the specific riser) when the item support apparatus is in a final deployed configuration. The lower projections may intersect at a point 34 that is below the lower termina when the item support apparatus is in its final deployed apparatus configuration.

It is also of note that in at least one embodiment of the inventive technology, in a final deployed apparatus configuration, risers may form an angle 35 (a relative angle) which may be changeable without effecting a concurrent change in a foot separation width. Thus, the two may be independently changeable.

It should be understood that in at least one embodiment, the desired elevation of the deployed arms may be achieved by either or both of: adjustment of the relative angle of the risers, and adjustment of the length of the risers. Adjustment of the length of the risers (resulting in an arm height adjust capability) may be achieved by risers that are telescopable 36, which feature itself may be achieved by a collar lock 37 perhaps being operable with a knob 38. There may also be height setting numbers on the extending riser part 39. Stoppage of the relative angle of the risers may be achieved by stops 40 which serve to obstruct further motion (e.g., rotation) of the risers. The stops may be a cam shape with lobes (where perhaps more than one lobe, each maybe having a different radial projection, may offer adjustment capability upon rotation of the cam), or may be an angle plate 41 that also obstructs so as to prevent further motion. The angle plate may provide only one or a very few selectable stoppage positions and be removable such that stoppage by another part of the apparatus provides an additional selectable stoppage position 42. The angle plate may be removable from an obstruction position for storage, perhaps at a different part of the apparatus 44. Stops may be removable from their stoppage position, either by unscrewing or snapping them out of an interference position (as but two examples). Indeed, a wide variety of manners of providing a desired obstruction (again, perhaps at different selectable stoppage positions) are contemplated by the term stop.

At least one arm (on which the supported item may rest) may be retained to each of the risers by an arm retainer. An arm retainer is a broad term that includes, inter alia, welds, joints that allow movement of the arm relative to the riser, and pivotal arm retainers 45. A pivotal arm retainer not only couples the arm to the riser but also enables rotation of the arm relative to the riser. An arm may be height adjustable, e.g., as where the riser to which it is retained is rotatable about a horizontal axis, and/or the riser to which it is retained is telescopable. An arm may be rotatable about an axis 46, e.g., a horizontal axis during elevation of the risers, that is different from that axis 26 (e.g. a horizontal axis) about which the risers may be rotatable. Arms may be rotatable during a superimposed revolving motion 47 such that the arms may be rotatable about a revolving axis 48 (e.g., a revolving horizontal axis). Of additional mention is that where more than one arm is retained to one riser, the apparatus may be said to have two support tiers 49.

It should be noted that in methods using the term "established", such term implies placing, positioning or situating the referenced element as indicated. Of particular note as to inventive methods of the apparatus is that in at least one embodiment, a relative angle of the risers may be changed without effecting a concurrent change in the foot separation width. Additionally of note is an inventive method whereby arms retained to the risers are deployable from an arm storage configuration 50 (an arm folded against each riser and risers in a storage configuration) to a final deployed arm configuration 52 by a single user and without requiring a change in hand grip.

Figure 30:
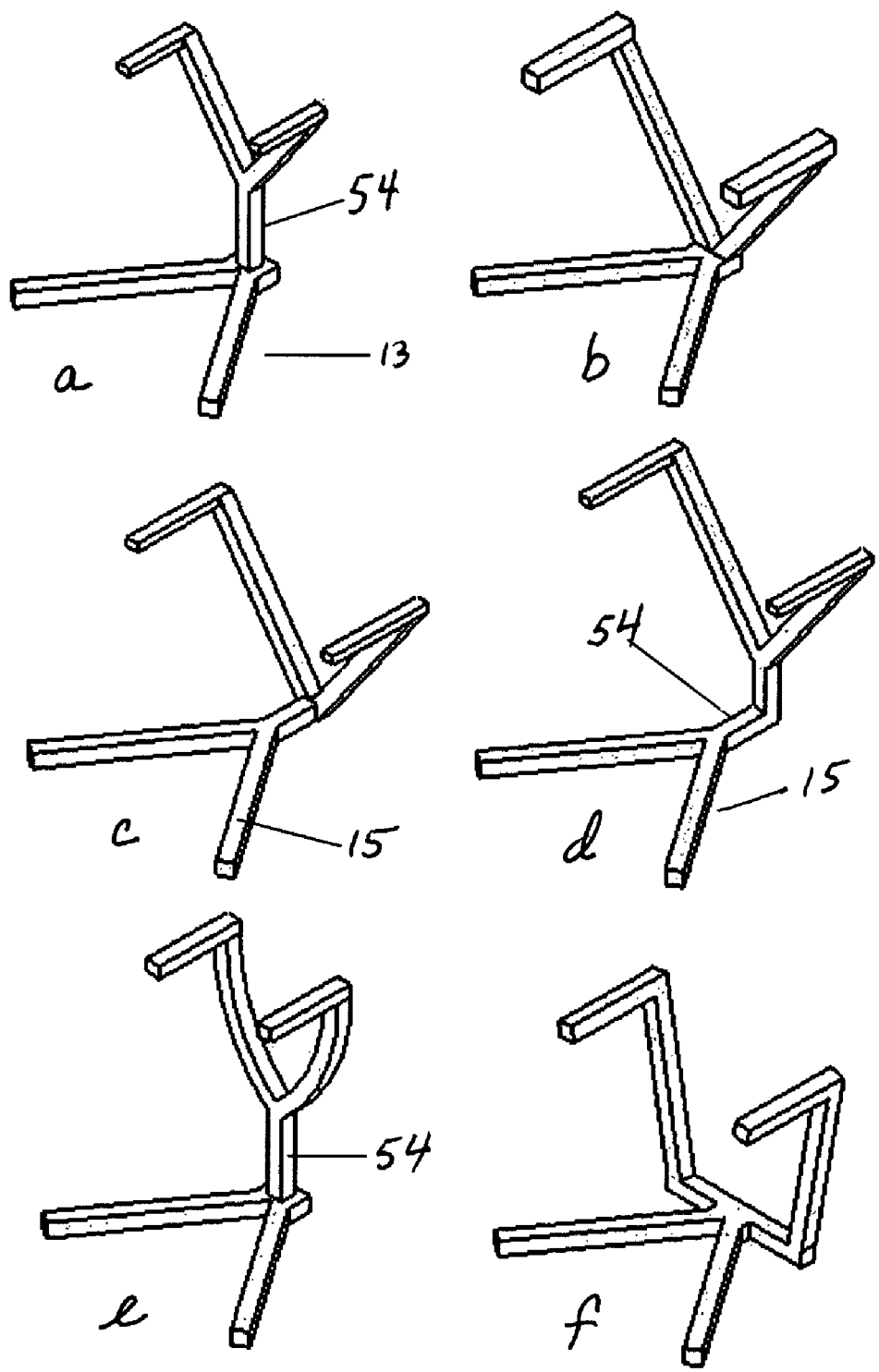
FIG. 30 shows schematic representations of embodiments of the inventive apparatus.
Figure 31:
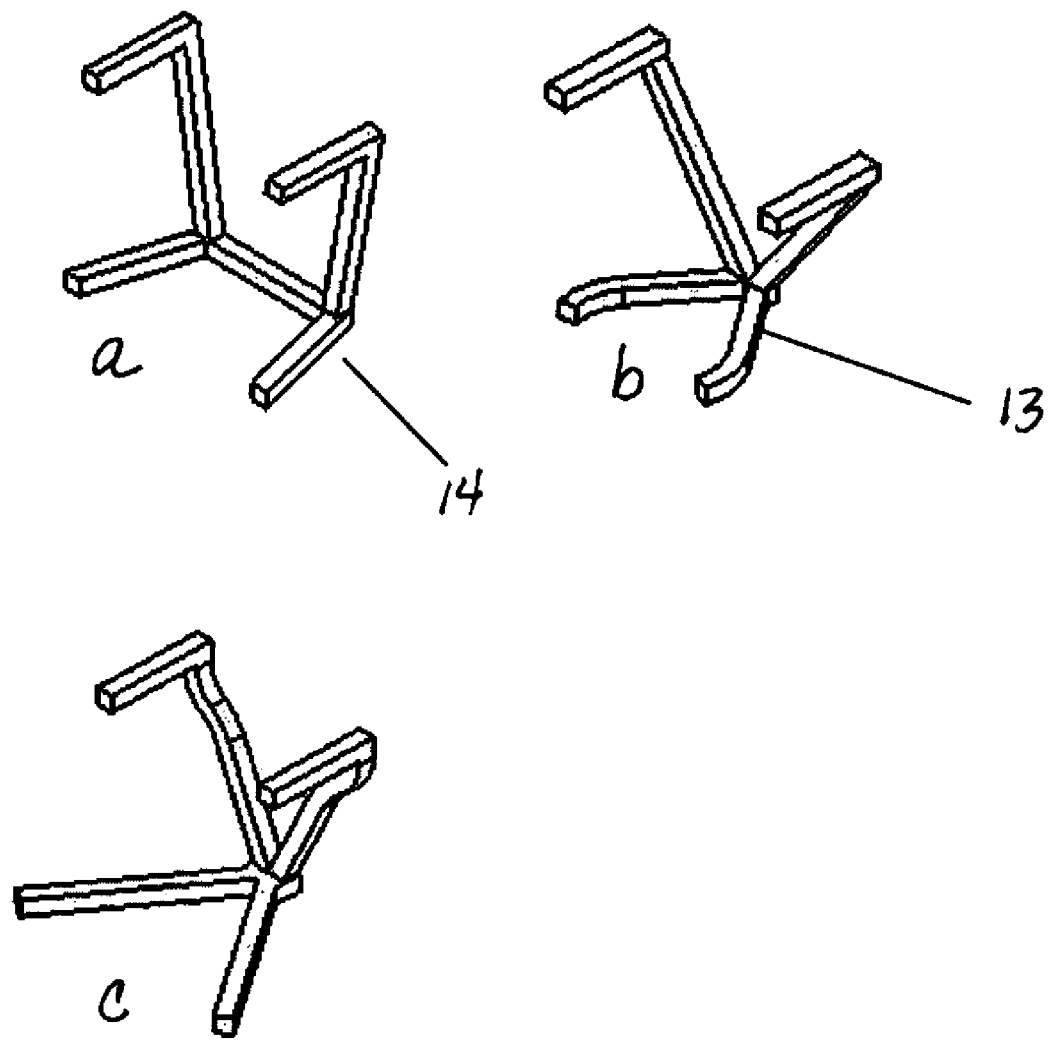
FIG. 31 shows schematic representations of embodiments of the inventive apparatus.

In at least one embodiment, an item support apparatus (a term that may refer to the entire apparatus or merely a part(s) thereof that play a role in the support afforded by the entire apparatus) may comprise a base, at least two divergent support members 53 emanating from the base, two retention elements that retain the divergent support members to the base, and at least two arms responsive to at least one of the divergent support members (it should be noted that two arms would be responsive to one divergent support member in a "double "Y" design"). A support member is a broad term and includes any substantially elongated part (curved or straight) of the apparatus that may play a role in supporting the supported item such that the item may remain substantially in a desired position (e.g., fixed position) upon application of a design (e.g., expected) load. It may include, in addition to risers, feet, arms, or parts 54 of the retention element that may emanate from the base (e.g., in a design having feet and/or risers that form parts of a "Y" shape), inter alia. The support member may be a substantially longitudinal member 55 (e.g., its length is greater than twice its width, depth or diameter) and may have any shape, including but not limited to circular, oval, square, rectangular, octagonal, hexagonal, etc. It may be a hollow member such as a tube or it may be solid such as a bar. In a "double "Y" design", where each the feet and the risers form upper parts of a "Y" shape (see FIG. 30d), two support members would emanate from the base. In a "single "Y" design" (where either the feet or the risers form upper parts of a "Y" shape as in FIG. 30a, 30c or 30e), three support members would emanate from the base. In a double "V" or a double "U" design (where the feet exhibit a "V" or a "U" shape and the risers exhibit a "V" or a "U" shape as in FIG. 30b, FIG. 31a, FIG. 31b and FIG. 31c), or in a UV design (see FIG. 30f, e.g.), four support members would emanate from the base. It should be understood that, for purposes of clarity, FIGS. 30 and 31 are merely schematic representations of what typically is a more complex appearing apparatus. Thus, the pivotal retainers that appear in the preferred embodiment do not appear in FIG. 30 or 31.

It should be noted that the term responsive is a general term that indicates that there is a motion in one part that will cause a response in another part. For example, an arm that is responsive to a support member indicates that there is a certain type of movement of that support member that will cause a movement in that arm. Of course, as is the case with the term "retain", it addresses designs where parts are not only in direct contact but also in indirect contact (e.g., part A is indirectly connected with part B via intermediate part C).

Figure 6:
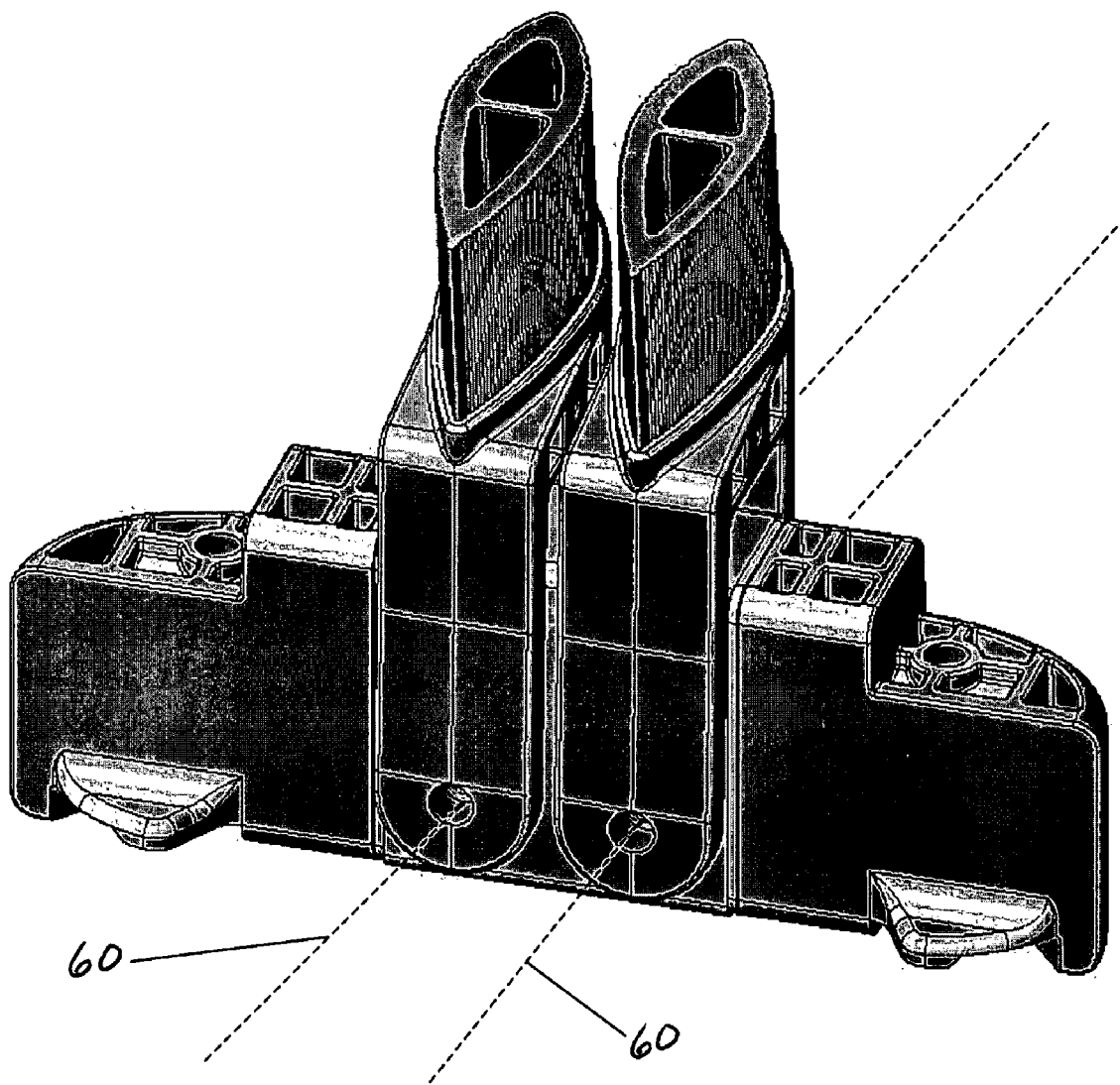
FIG. 6 shows an embodiment of the base and retainers.

The inventive technology also includes a support apparatus (which in at least one embodiment is shown in FIG. 6) that comprises a base having a first part 56 that is rotatable relative to a second part 57, and at least two pivot retention elements joined to the base and adapted to pivotally retain at least four support members to the base. A first of the pivot retention elements may pivotally retain a first set of two of the support members to the base and enable pivoting of the first set of two support members about at least one first axis, and a second 58 of the pivot retention elements may pivotally retain a second set 59 of two of the support members to the first part of said base, thereby enabling pivoting of the second set of two support members about at least one second axis 60.

It should be noted that although certain descriptions herein of embodiments of the inventive technology may be given explicitly for item support apparatus and methods, these descriptions should be understood to apply to also other, more specific item support apparatus and methods such as musical instrument support apparatus and methods (including keyboard support apparatus and methods). Indeed, if the term "musical instrument" in the claims as originally filed were replaced with the term "item", the description provided herein should be understood to also describe such subject matter, as the description herein relates to item support apparatus and methods, musical instrument support apparatus and methods, and keyboard support apparatus and methods, inter alia. The term musical instrument should be understood to include not only traditional musical instruments such as a keyboard, xylophone, marimba, bells, glockenspiel (or other melody percussion instruments), and the dobro, but also DJ equipment, record scratching turntables, speakers, a sound board or any other items that may be used to produce or alter musical sounds. Items other than musical instruments that may be supported include a tabletop, a work surface, a drafting table, etc.

Other features that may be incorporated in the inventive apparatus include a handle 61 that is attached to some part of the stand (e.g., a riser or a foot) such that the apparatus can be easily carried in its storage configuration. Embodiments may include an accessory attachment such as a sheet music holder 62 or a microphone boom attachment 63, to name a few. Of course, the handled design would work best when at least some parts of the apparatus can lock (e.g., prevent rotation in at least an impending motion direction) into their collapsed configuration—perhaps after certain parts are forced into a locked position, as where the legs and/or risers can be locked into a retainer (e.g., a yieldable retainer such as a collar retainer 64, which may be part of a collar lock) established around at least part of another support member(s) in some embodiments). The lock may also be provided at the retention element, perhaps using a spring loaded detent. In a preferred embodiment, the feet are lockable to collar retainers established around the risers, although the inventive technology includes designs where other support members are lockable to different support members upon reaching their storage position. A collar retainer may include a yieldable retainer part that can receive and can retain against expected transport forces a different support member or lock part attached thereto.

It should also be noted that in some embodiments, support members (e.g., the feet, the risers and the arms) may fully lock (automatically or not) up reaching their final deployed positions. Although such locking is certainly not necessary (as the preclusion of rotation in perhaps only an impending direction under load afforded as an inherent feature of the non-locking designs may be sufficient retention), it may be a desired and easily added feature of some designs in which a fully locked final deployed apparatus configuration is desired.

Embodiments of the inventive apparatus may also incorporate elements that allow for cabling against or within support member(s) of the apparatus so that electronic items (e.g., a keyboard or a soundboard, as but two examples) may be powered in an efficient and clean-appearing manner. Some such elements may include cable clips 65 that enable attachment (e.g., removable attachment) of the cable(s) to the outside of support members (e.g., risers); a channel that enables concealed attachment of the cable(s) to the outside of support members (e.g., risers); and/or ports at certain parts of the apparatus that allow a cable(s) to be established inside at least part of a support member(s).

Although the fully collapsible design may be preferred for reasons related to limited storage space, a butterfly design (which may be even more quickly set up than a fully collapsible design but take up more storage space) is also included within the inventive technology.

Examples of the many materials of which the apparatus may be made include plastic, metal, fiberglass, wood, ceramics, graphite, carbon fiber materials, glass, or combinations thereof, or generally, any material(s) that are sufficiently strong to provide support necessary. Manners of making the apparatus are well within the skills of one of ordinary skill in the art, and include extrusion molding, injection molding other types of molding, and/or machining, as but a few.

As can be easily understood from the foregoing, the basic concepts of the present invention may be embodied in a variety of ways. It involves both item (e.g., musical instrument) support techniques as well as devices to accomplish the appropriate support. In this application, the item support techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Not only are apparatus claims included for the device described, but also method or process claims are included to address the functions the invention and each element performs. Neither the description nor the terminology is intended to limit the scope of the claims in this or any subsequent patent application.

It should also be understood that a variety of changes may be made without departing from the essence of the invention. Such changes are also implicitly included in the description. They still fall within the scope of this invention. A broad disclosure encompassing both the explicit embodiments shown, the great variety of implicit alternative embodiments, and the broad methods or processes and the like are encompassed by this disclosure and may be relied in order to support one or more of the claims of this or any subsequent patent application. With this understanding, the reader should be aware that this disclosure is to be understood to support as broad a base of claims as deemed within the applicant's right that are designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "retainer" should be understood to encompass disclosure of the act of "retaining"—whether explicitly discussed or not—and, conversely, were there effectively disclosure of the act of "retaining", such a disclosure should be understood to encompass disclosure of a "retainer" and even a "means for retaining" Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the Reference Table or other information statement or list of references filed with the application are hereby appended and hereby incorporated by reference, however, as to each of the above, to the extent that such information or statements incorporated by reference might be considered inconsistent with the patenting of this inventions such statements are expressly not to be considered as made by the applicants.

I. U.S. Patent Documents

| | | |
|---|---|---|
| D257,987 | Jan. 20, 1981 | Schoenig |
| D264,852 | Jun. 08, 1982 | Schoenig |
| D288,755 | Mar. 17, 1987 | Schoenig |
| D289,952 | May 26, 1987 | Kido |
| D290,355 | Jun. 16, 1987 | Nagele |
| D304,270 | Oct. 31, 1989 | Goldman |
| D306,943 | Apr. 03, 1990 | Hodge et al. |
| D320,034 | Sep. 17, 1991 | Brooks et al. |
| D321,293 | Nov. 05, 1991 | Kucsak |
| D364,516 | Nov. 28, 1995 | Helenowski |
| D414,962 | Oct. 12, 1999 | Welsh et al. |
| D468,133 S | Jan. 07, 2003 | Lauts |
| D470,336 S | Feb. 18, 2003 | Malizia |
| D475,555 S | Jun. 10, 2003 | Lauts |
| D409,594 | May 11, 1999 | Lepack |
| D409,020 | May 04, 1999 | Hardin |
| D370,575 | Jun. 11, 1996 | Lechleiter et al. |
| D336,099 | Jun. 01, 1993 | Schoenig |
| D323,081 | Jan. 14, 1992 | Schaffer |
| D268,458 | Apr. 05, 1983 | Schoenig |
| D18,940 | Feb. 26, 1889 | Jackson |
| D688,623 | Dec. 10, 1901 | Forry |
| D335,889 | May 25, 1993 | Gibran |
| D137,960 | May 23, 1944 | Hager |
| D268,458 | Apr. 05, 1983 | Schoenig |
| 2002/0,109,051 A1 | Aug. 15, 2002 | Kitagawa et al. |
| 2002/0,100,852A1 | Aug. 01, 2002 | Eason et al. |
| 3,338,539 | Aug. 29, 1967 | Foster |
| 4,321,874 | Apr. 30, 1982 | Cenna |
| 4,445,415 | May 01, 1984 | Izquierdo |
| 4,669,691 | Jun. 02, 1987 | Solomon |
| 4,763,865 | Aug. 16, 1988 | Danner |
| 4,770,380 | Nov. 13, 1988 | Eason et al. |
| 4,917,341 | Apr. 17, 1990 | Pirchio |
| 4,988,064 | Jan. 29, 1991 | Hoshino |
| 4,988,150 | Jan. 29, 1991 | Lindow et al. |
| 5,112,020 | May 12, 1992 | Ginsberg |
| 5,165,635 | Nov. 24, 1992 | Hoshino |
| 5,188,321 | Feb. 23, 1993 | Hirschenson et al. |
| 5,199,930 | Apr. 06, 1993 | Weber |
| 5,208,736 | May 04, 1993 | Crooks et al. |
| 5,301,910 | Apr. 12, 1994 | Lang et al. |
| 5,312,076 | May 17, 1994 | Rogov |
| 5,322,250 | Jun. 21, 1994 | Wilhite, Jr |
| 5,358,204 | Oct. 25, 1994 | Terada |
| 5,358,204 | Oct. 25, 1994 | Terada |
| 5,390,764 | Feb. 21, 1995 | Kerber |
| 5,395,088 | Mar. 07, 1995 | Ginsberg |
| 5,467,953 | Nov. 21, 1995 | Malizia |
| 5,509,629 | Apr. 23, 1996 | Sassmannshausen et al. |
| 5,565,889 | Oct. 15, 1996 | Crooks et al. |
| 5,572,237 | Nov. 05, 1996 | Crooks et al. |
| 5,603,480 | Feb. 18, 1997 | Chen |
| 5,732,928 | Mar. 31, 1998 | Chang |
| 5,894,406 | Apr. 13, 1999 | Blend et al. |
| 5,996,814 | Dec. 07, 1999 | Workman et al. |
| 6,045,179 | Apr. 04, 2000 | Harrison |
| 6,375,135 | Apr. 23, 2002 | Eason et al. |

II. Other Documents

Konig & Meyer Spider Keyboard Stand, audioMIDI.com Dec. 28, 2004
Ultimate Support Systems, Inc. 1994 Product Catalog
Ultimate Support Systems, Inc. 1996 Product Catalog
Ultimate Support Systems, Inc. 1999 Product Catalog
Ultimate Support Systems, Inc. 2000 Product Catalog
Ultimate Support Systems, Inc. 2001 Product Catalog
Ultimate Support Systems, Inc. 2002 Product Catalog
Ultimate Support Systems, Inc. 2003 Product Catalog Thus, the applicants should be understood to have support to claim and make a statement of invention to at least: i) each of the item support devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented; xiii) each feature, component, and step shown as separate and independent inventions; and xiv) the various combinations and permutations of each of the above and of any elements of each claim. In this regard it should be understood that for practical reasons and so as to avoid adding potentially hundreds of additional claims, the applicant has presented the claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim as dependencies or elements under any other independent claim.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Both the priority filing, if any, and the claims set forth later in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The claims initially presented are to be understood as also stating in this textual section of the specification, clauses and subject matter that are expressly designated by the applicant to be part of the description of embodiments of the invention. They may be used by the applicant to support any later claim(s) recited, amended, or reinserted in this patent application and may be used to support any claims recited in any subsequent continuation, continuation-in-part, or division patent application. Further, even if subsequently amended, cancelled, or otherwise altered, the claims originally set forth in this and the priority filing(s) are hereby incorporated by reference as part of this section, and the applicant expressly reserves the right to use all of or a portion of any of the content of such as additional description to support any claim or element, any amendment, and any component thereof. The content of this section (both listed and incorporated by reference) shall survive during the entire pendency of this application including any subsequent continuation, division, or continuation-in-part thereof or any reissue or extension thereon.

Finally, it should be understood that the term "at least one" as used in the description and claims is not intended nor used in this disclosure to mean that other claims or descriptions not incorporating the "at least one" language cannot further include one or more like elements and the language "at least one" is not intended nor used to change "open-ended" claims, inherently including devices or methods having additional elements or steps apart from those claimed, into "closed-ended" claims wherein devices or methods having additional elements would not be covered by such claims. Further, if or when used, the use of the transitional phrase "comprising" (or its equivalent in Australia and the like, "including") is used to maintain the "open-end" claims herein, according to traditional claim interpretation. Thus, unless the context requires otherwise, it should be understood that the term "comprise", "include" (if or when inserted), or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. Further, this application should be considered to support claims as follows: methods substantially as described hereinbefore and with reference to any of the accompanying examples, and apparatus substantially as described hereinbefore and with reference to any of the accompanying examples.

What is claimed is:

1. A musical instrument support apparatus, comprising:
   at least two feet;
   a base to which said feet are retained by a first retention element;
   at least two pivotally deployable risers pivotally retained to said base by a second retention element; and
   at least one arm retained to each of said risers by an arm retainer,
   wherein said second retention element is a pivot retention element,
   wherein, during deployment of said musical instrument support apparatus,
      said at least two pivotally deployable risers are pivotable about a first horizontal axis; and
      said at least one arm is each pivotable about a second horizontal axis that is different from said first horizontal axis,
   wherein at least one of said retention elements is established at a part of said base that is rotatable relative to a different part of said base.

2. A musical instrument support apparatus as described in claim 1 wherein said first retention element comprises a first retainer set.

3. A musical instrument support apparatus as described in claim 1 wherein said second retention element comprises a second retainer set.

4. A musical instrument support apparatus as described in claim 1 wherein said second retention element is established at a first part of said base that is rotatable relative to a second part of said base.

5. A musical instrument support apparatus as described in claim 1 first axis does not revolve during deployment of said musical instrument support apparatus.

6. A musical instrument support apparatus as described in claim 1 second axis revolves during deployment of said musical instrument support apparatus.

7. A musical instrument support apparatus as described in claim 1 wherein said second retention element enables rotation of said risers about said first horizontal axis and a non-horizontal axis.

8. A musical instrument support apparatus as described in claim 1 wherein at least one of said retention elements enables rotation of a retained support member about two axes.

9. A musical instrument support apparatus as described in claim 1 further comprising a musical instrument supported by said musical instrument support apparatus.

10. A musical instrument support apparatus as described in claim 1 wherein said musical instrument support apparatus comprises a keyboard support apparatus.

11. A musical instrument support apparatus as described in claim 1 further comprising at least one cable attachment element.

12. A musical instrument support apparatus as described in claim 1 further comprising ports which enable establishment of a cable inside at least part of a support member.

13. A musical instrument support apparatus, comprising:
    a base;
    at least three divergent support members emanating from said base;
    two retention elements that retain said at least three divergent support members to said base; and
    at least two arms attached to and rotatable relative to at least one of said at least two three divergent support members.

14. A musical instrument support apparatus as described in claim 13 wherein at least one of said at least three divergent support members splits into two additional support members.

15. A musical instrument support apparatus as described in claim 14 wherein said at least one of said at least three divergent support members that splits into two additional support members, and said two additional support members form a Y shape.

16. A musical instrument support apparatus as described in claim 14 wherein said at least one of said at least three divergent support members that splits into two additional support members, and said two additional support members are risers.

17. A musical instrument support apparatus as described in claim 13 wherein said at least three divergent support members comprises at least four divergent support members.

18. A musical instrument support apparatus as described in claim 17 wherein two of said at least four divergent support members are feet and a remaining two of said at least four divergent support members are risers.

19. A musical instrument support apparatus as described in claim 18 wherein said risers form a V shape when said apparatus is in a final deployed apparatus configuration.

20. A musical instrument support apparatus as described in claim 18 wherein said risers form a U shape when said apparatus is in a final deployed apparatus configuration.

21. A musical instrument support apparatus as described in claim 17 wherein said at least two arms are retained to said risers.

22. A musical instrument support apparatus as described in claim 21 wherein said at least two arms are retained to said risers via an arm retainer.

23. A musical instrument support apparatus as described in claim 13 wherein said at least three divergent support members comprises at least three radially divergent support members.

24. A musical instrument support apparatus as described in claim 13 wherein at least two of said at least three divergent support members are retained at a first part of said base that is rotatable relative to a second part of said base.

25. A musical instrument support apparatus as described in claim 13 wherein at least two of said at least three divergent support members are each pivotable about two axes.

26. A musical instrument support apparatus as described in claim 13 wherein at least one of said support members splits into two additional support members.

27. A musical instrument support apparatus as described in claim 26 wherein said at least one of said support members that splits into two additional support members splits into two risers.

28. A musical instrument support apparatus as described in claim 13 wherein said musical instrument support apparatus comprises a keyboard support apparatus.

29. A musical instrument support apparatus comprising:
    a base;
    at least two divergent support members emanating from said base;
    two retention elements that retain said at least two divergent support members to said base;
    at least two arms attached to and rotatable relative to at least one of said at least two divergent support members; and
    at least one cable attachment element connected to said at least one of said at least two divergent support members to which said at least two arms are attached.

30. A musical instrument support apparatus comprising:
a base;
at least two divergent support members emanating from said base;
two retention elements that retain said at least two divergent support members to said base;
at least two arms attached to and rotatable relative to at least one of said at least two divergent support members; and:
ports which enable establishment of a cable inside at least part of said at least one of said at least two divergent support members to which said at least two arms are attached.

* * * * *